US011961444B2

(12) United States Patent
Huang et al.

(10) Patent No.: US 11,961,444 B2
(45) Date of Patent: Apr. 16, 2024

(54) TRANSPARENT DISPLAY DEVICE

(71) Applicant: Innolux Corporation, Miao-Li County (TW)

(72) Inventors: Yu-Chia Huang, Miao-Li County (TW); Yuan-Lin Wu, Miao-Li County (TW); Tsung-Han Tsai, Miao-Li County (TW); Kuan-Feng Lee, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/164,557

(22) Filed: Feb. 3, 2023

(65) Prior Publication Data

US 2023/0186813 A1 Jun. 15, 2023

Related U.S. Application Data

(63) Continuation of application No. 17/571,531, filed on Jan. 10, 2022, now Pat. No. 11,594,165.

(30) Foreign Application Priority Data

Feb. 5, 2021 (CN) ......................... 202110161626.0

(51) Int. Cl.
*G09G 3/20* (2006.01)

(52) U.S. Cl.
CPC ....... *G09G 3/20* (2013.01); *G09G 2300/0404* (2013.01); *G09G 2310/0275* (2013.01)

(58) Field of Classification Search
CPC ............. G09G 3/20; G09G 2300/0404; G09G 2310/0275
See application file for complete search history.

(56) References Cited

U.S. PATENT DOCUMENTS

| | | | | |
|---|---|---|---|---|
| 2012/0190197 | A1* | 7/2012 | Hui | G03F 1/76 438/689 |
| 2016/0189345 | A1* | 6/2016 | Fujita | G09G 5/12 345/660 |
| 2017/0094814 | A1* | 3/2017 | Chin | H05K 5/0017 |
| 2017/0132970 | A1* | 5/2017 | Tang | G09G 3/3208 |
| 2017/0154566 | A1* | 6/2017 | Ryoo | H10K 59/131 |
| 2017/0178588 | A1* | 6/2017 | Choi | G09G 3/3696 |
| 2019/0129223 | A1* | 5/2019 | Huang | G02F 1/13338 |
| 2019/0165325 | A1* | 5/2019 | Lee | H10K 59/38 |

(Continued)

FOREIGN PATENT DOCUMENTS

CN 107316605 11/2017

OTHER PUBLICATIONS

Yang Sun, Nov. 5, 2020, Society for Information Display (Year: 2020).*

(Continued)

*Primary Examiner* — Sejoon Ahn
(74) *Attorney, Agent, or Firm* — JCIPRNET

(57) ABSTRACT

The disclosure provides a transparent display device including a display panel. The display panel includes a display area, a non-display area, and a plurality of pixels. The non-display area is adjacent to the display area. The plurality of pixels are disposed in the display area. A difference between a transmittance of the display area and a transmittance of the non-display area is less than 30% of the transmittance of the display area.

18 Claims, 17 Drawing Sheets

(56) References Cited

U.S. PATENT DOCUMENTS

| | | | | |
|---|---|---|---|---|
| 2019/0279547 | A1* | 9/2019 | Zhu | G09G 3/20 |
| 2020/0320959 | A1* | 10/2020 | Ryu | G09G 3/3266 |
| 2021/0012706 | A1* | 1/2021 | Yang | G09G 3/32 |
| 2021/0202680 | A1* | 7/2021 | Shin | H10K 59/1315 |
| 2021/0399063 | A1* | 12/2021 | Yamaue | G09G 3/3233 |
| 2021/0399081 | A1* | 12/2021 | Park | H10K 59/353 |

OTHER PUBLICATIONS

"Office Action of China Counterpart Application", issued on Feb. 27, 2024, p. 1-p. 7.

* cited by examiner

TRANSPARENT DISPLAY DEVICE

CROSS-REFERENCE TO RELATED APPLICATION

This is a continuation of a prior application Ser. No. 17/571,531, filed on Jan. 10, 2022, which claims the priority benefit of China application serial no. 202110161626.0, filed on Feb. 5, 2021. The entirety of each of the above-mentioned patent applications is hereby incorporated by reference herein and made a part of this specification.

BACKGROUND

Technical Field

The disclosure relates to a transparent display device.

Description of Related Art

With the development of related display technologies, display devices have been applied to many products. In order to match the functions and characteristics of a product with the product itself, transparent display devices are required in many designs. Therefore, research and development of transparent display devices have gradually attracted attention.

SUMMARY

The disclosure provides a transparent display device.

According to embodiments of the disclosure, a transparent display device includes a display panel. The display panel includes a display area, a non-display area, and a plurality of pixels. The non-display area is adjacent to the display area. The plurality of pixels are disposed in the display area. A difference between a transmittance of the display area and a transmittance of the non-display area is less than 30% of the transmittance of the display area Based on the above, in the embodiments of the disclosure, by disposing the driving element in the non-exposed region in the transparent display device, the uniformity of the transmittance of the transparent display device in the exposed region may be improved.

In order to make the aforementioned features and advantages of the invention comprehensible, embodiments accompanied with drawings are described in detail below.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DESCRIPTION OF THE EMBODIMENTS

Figure 1:
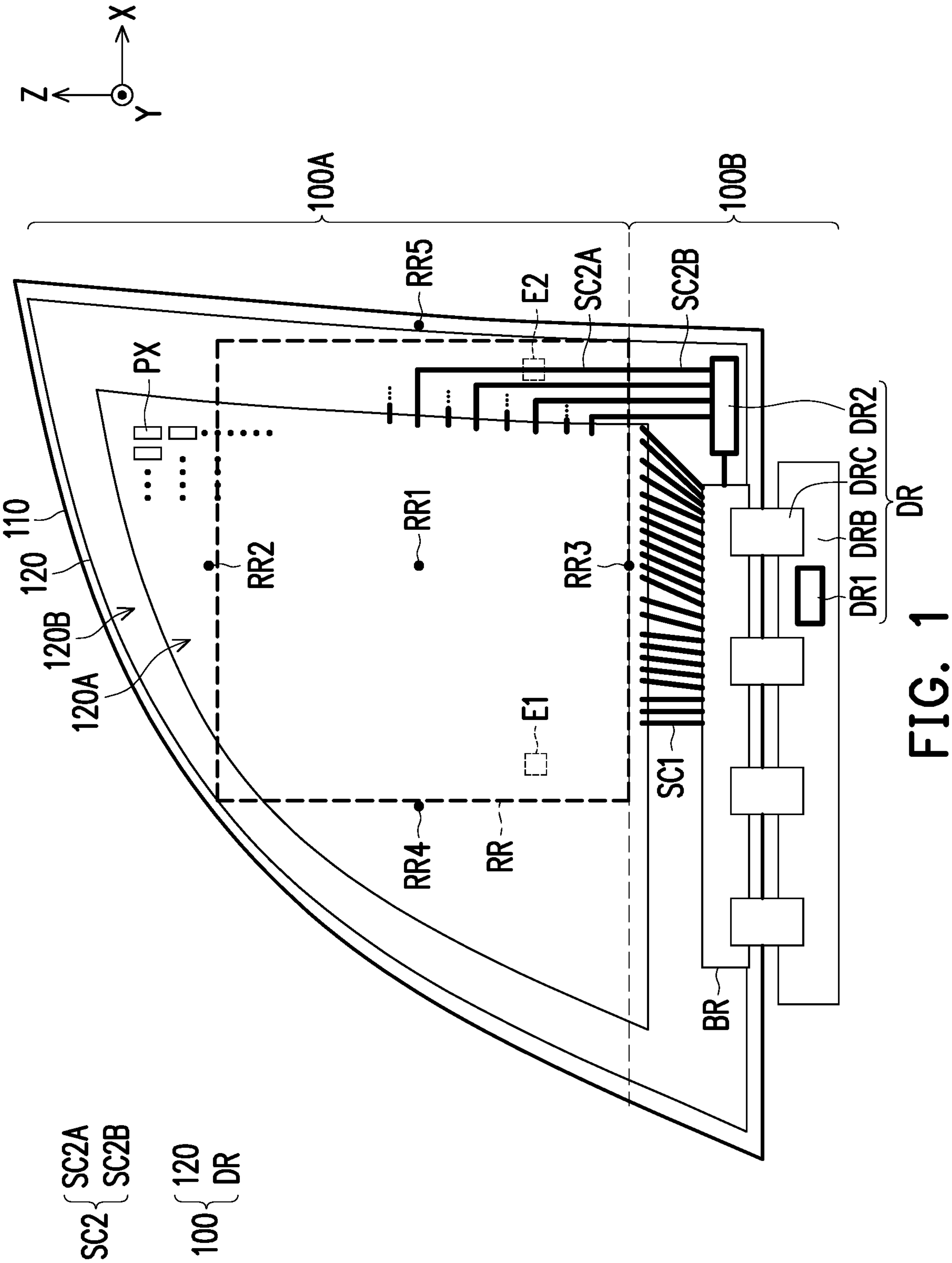
FIG. 1 is a schematic view of a transparent display device according to an embodiment of the disclosure.

Reference will now be made in detail to the exemplary embodiments of the disclosure, and examples of which are illustrated in the accompanying drawings. Whenever possible, the same reference numerals are used to represent the same or similar parts in the accompanying drawings and description.

Throughout the specification and the appended claims of the disclosure, certain terms are used to refer to specific elements. Those skilled in the art should understand that display device manufacturers may probably use different names to refer to the same elements. The specification is not intended to distinguish between elements that have the same function but different names. In the following specification and claims, the terms "including" and "having", etc., are open-ended terms, so they should be interpreted to mean "including but not limited to . . . ".

Directional wordings mentioned in the specification, such as "up," "down," "left," "right," "front," and "back," merely refer to directions in the accompanying drawings. Therefore, the directional wordings are used to illustrate rather than limit the disclosure. In the drawings, each drawing illustrates the general features of the methods, structures, and/or materials used in specific embodiments. However, the drawings should not be interpreted as defining or limiting the scope or nature covered by the embodiments. For example, for clarity, a relative size, a thickness, and a location of each film layer, region, and/or structure may be reduced or enlarged.

A structure (or layer, element, substrate) being located on another structure (or layer, element, substrate) described in the disclosure may mean that two structures are adjacent and directly connected, or may mean that two structures are adjacent and indirectly connected. Indirect connection means that there is at least one intermediate structure (or intermediate layer, intermediate element, intermediate substrate, intermediate spacing) between two structures, the lower surface of a structure is adjacent or directly connected to the upper surface of the intermediate structure, and the upper surface of the other structure is adjacent or directly connected to the lower surface of the intermediate structure. The intermediate structure may be a single-layer or multi-layer physical structure or non-physical structure, which is not limited. In the disclosure, when a structure is disposed "on" another structure, it may mean that a structure is "directly" disposed on another structure, or a structure is "indirectly" disposed on another structure, that is, at least one structure is sandwiched between a structure and another structure.

The terms "electrically connected to" or "coupled to" described in the disclosure may refer to direct connection or indirect connection. In the case of direct connection, the terminals of the elements on the two circuits are directly connected or connected to each other by a conductor line. In the case of indirect connection, there are switches, diodes, capacitors, inductors, resistors, other suitable elements, or a combination thereof between the terminals of the elements on the two circuits, but the disclosure is not limited thereto.

In the disclosure, the thickness, length, or width may be measured by an optical microscope, and the thickness or the width may be measured according to a cross-sectional image in an electron microscope, but the disclosure is not limited thereto. In addition, there may be a certain error between any two values or directions used for comparison. Moreover, in the disclosure, the terms such as "about", "equal", "same", "substantially", or "approximately" are generally interpreted as being within a range of plus or minus 15% of a given value or range, or as being within a range of plus or minus 5%, plus or minus 3%, plus or minus 2%, plus or minus 1%, or plus or minus 0.5% of the given value or range. In addition, the terms "the scope between the first value and the second value" and "ranging from the first value to the second value" mean that the range includes the first value, the second value, and other values in between.

In the disclosure, the features of multiple embodiments to be described below may be replaced, recombined, or mixed to form other embodiments without departing from the spirit of the disclosure. The features of multiple embodiments may be used in combination as long as such combination does not depart from the spirit of the disclosure or lead to conflict.

FIG. 1 is a schematic view of a transparent display device according to an embodiment of the disclosure. In FIG. 1, for example, a transparent display device 100 includes an exposed region 100A and a non-exposed region 100B. The non-exposed region 100B may partially surround the exposed region 100A. In some embodiments, the non-exposed region 100B is substantially distributed around part of the periphery of the transparent display device 100 and may not surround the entire exposed region 100A. In some embodiments, the exposed region 100A may extend to part of the periphery of the transparent display device 100 without being completely surrounded by the non-exposed region 100B. The non-exposed region 100B may be interpreted as an area in the transparent display device 100 that may be hidden by a frame (not shown in FIG. 1) or may be disposed inside the frame. In some embodiments, in an actual implementation, the non-exposed region 100B may be hidden and may not be directly seen by the user. The exposed region 100A may be interpreted as an area in the transparent display device 100 that may be exposed in an actual implementation. However, the disclosure does not exclude the situation when the exposed region 100A is temporarily hidden as the transparent display device is in operation. For example, in an actual implementation, the transparent display device 100 may have different operation states. In some operation states, at least part of the exposed region 100A may be exposed for the user to see it directly. In other operation states, the exposed region 100A that can be seen by the user may be partially or completely hidden. In other words, when the transparent display device 100 is in operation, the exposed region 100A may be hidden or exposed, but the non-exposed region 100B may be hidden in any operation state. For ease of comprehension, in FIG. 1 and the subsequent drawings, the orientations of the transparent display device 100 in the respective drawings are illustrated in the X direction, the Y direction, and the Z direction. The Y direction may be perpendicular to the upper surface or the lower surface of the transparent display device 100, and the X direction and the Z direction may be parallel to the upper surface or the lower surface of the transparent display device 100. The Y direction may be perpendicular to the X direction and the Z direction, and the X direction may be perpendicular to the Z direction. In the embodiment, the plane of the transparent display device 100 is illustrated as a plane oriented in the X direction and the Z direction.

The transparent display device 100 may at least include a display panel 120 and a driving element DR. The display panel 120 may include multiple pixels PX. For example, the pixels PX are disposed in the exposed region 100A, and the driving element DR is disposed in the non-exposed region 100B. The driving element DR is adapted for driving the pixels PX. The pixels PX may be adopted to emit light to display images, and the driving element DR may be adopted to transmit the signals required by the pixels PX to the pixel. In some embodiments, for example, the pixels PX may include liquid crystals, organic light-emitting diodes (OLEDs), inorganic light-emitting diodes (LEDs), mini-LEDs, micro-LEDs, quantum dots (QDs), quantum dot diodes (QLEDs/QDLEDs), electro-phoretic, fluorescence, phosphors, other suitable materials, or a combination thereof, but the disclosure is not limited thereto. In some embodiments, the multiple pixels PX may emit light of multiple colors to achieve an effect of colorful display. The driving element DR may be an opaque element, so disposing the driving element DR in the non-exposed region 100B may reduce the range of the opaque area defined by the driving element DR in the exposed region 100A of the transparent display device 100, which contributes to improving the overall transmittance of the exposed region 100A, and/or increasing the area of the exposed region 100A that may exhibit a transparent effect. The transparent display device in the disclosure may be applied to various fields, such as buildings, automobiles, interior decoration, signboards, shop windows, or optical devices, but the disclosure is not limited thereto.

In FIG. 1, the display panel 120 of the transparent display device 100 may be disposed on a carrier 110. For example, the carrier 110 may be a plate with translucency and sufficient supporting properties. In some embodiments, the material of the carrier 110 may include glass, quartz, sapphire, polymer (e.g., polyimide (PI)), polyethylene terephthalate (PET) and/or other suitable materials, a combination thereof, or the like, and the disclosure is not limited thereto. In some embodiments, the carrier 110 may have a single-layer or multi-layer structure. Specifically, the display panel 120 may be attached to or fabricated on the carrier 110. In some embodiments, the display panel 120 may be a transparent display panel. In other words, the display panel 120 has a certain transmittance so that the user may see the view behind the display panel 120. In some embodiments, the area of the display panel 120 may be less than or equal to the area of the carrier 110, but the disclosure is not limited thereto.

The display panel 120 may include a display area 120A and a non-display area 120B. The pixels PX are disposed in the display area 120A to display images in the display area 120A, and the non-display area 120B may surround the display area 120A. The display area 120A overlaps the exposed region 100A of the transparent display device 100, at least part of the non-display area 120B overlaps the exposed region 100A, and another part overlaps the non-exposed region 100B. The non-display area 120B may include a bonding region BR disposed in the non-exposed region 100B. Moreover, in addition to the pixels PX disposed on the display panel 120, data connection lines SC1 and scan connection lines SC2 are further disposed thereon. Specifically, signal lines (not shown) corresponding to the pixels PX, such as scan lines and data lines, are disposed in the display area 120A, and the data connection lines SC1 and the scan connection lines SC2 may be connected to the signal lines disposed in the display area 120A. The data connection lines SC1 and the scan connection lines SC2 may extend outward from the periphery of the display area 120A, and at least a part of the lines extend to the bonding region BR.

The driving element DR may include a data driving element, a gate driving element, a driving carrier board DRB, and a connecting element DRC. The data driving element may include a driving circuit DR1; and the gate driving element may include a driving circuit DR2, the driving carrier board DRB, and the connecting element DRC. The driving circuit DR1 may be disposed on the driving carrier board DRB. The driving circuit DR1 may include an integrated circuit element, but the disclosure is not limited thereto. Moreover, the driving carrier board DRB may be a circuit board, such as a printed circuit board, but the disclosure is not limited thereto. The driving carrier board DRB may be bonded to the bonding region BR of the display panel 120 through one or more connecting elements DRC and connected to the data connection lines SC1. For example, the connecting element DRA may include a flexible circuit board, but the disclosure is not limited thereto. Therefore, the driving circuit DR1 of the driving element DR may transmit the corresponding signals to the pixels PX through the connecting element DRC and the multiple data connection lines SC1. In addition, the driving circuit DR2 may be disposed on the display panel 120, and the driving circuit DR2 of the driving element DR may transmit multiple signals to the pixels PX through multiple scan connection lines SC2.

In some embodiments, the driving circuit DR1 may include a data signal driving circuit for providing the data signal required by the pixel PX, and the driving circuit DR2 may include a scan signal driving circuit for providing the scan signal required by the pixel PX. In some embodiments, the driving circuit DR1 may be a packaged integrated circuit element, and the driving circuit DR2 may include elements, such as multiple transistors, multiple capacitors, and other elements fabricated on the display panel 120, but the disclosure is not limited thereto. In some embodiments, the driving circuit DR2 does not have an independent package structure but is integrated in the circuit layer of the pixel PX, but it is not limited thereto. In other embodiments, for example, the driving circuit DR2 (the scan signal driving circuit) may be implemented as a packaged integrated circuit element like the driving circuit DR1, or it may be integrated in the packaged integrated circuit element of the driving circuit DR1.

In the embodiment, the driving elements DR are all disposed in the non-exposed region 100B of the transparent display device 100, which contributes to improving the transmittance of the exposed region 100A, such as the transmittance of visible light, or to improving the uniformity of the transmittance of the exposed region 100A. Therefore, when in operation, the transparent display device 100 may have good performance in light transmission, and since the transmittance of the exposed region 100A is uniform, the user may see the environment behind the transparent display device 100 clearly. For example, in a rectangular range RR having the largest area in the range of the exposed region 100A, the center point RR1 of the rectangular range RR may be defined; along the Z direction, the center point RR1 is projected to the edge points RR2 and RR3 of the edge of the rectangular range RR; and along the X direction, the center point RR1 is projected to the edge points RR4 and RR5 of the edge of the rectangular range RR. The difference in the transmittance of the transparent display device 100 at the center point RR1, the edge point RR2, the edge point RR3, the edge point RR4, and the edge point RR5 may be within 30%. For example, |(transmittance TRRi−transmittance TRRj)|/transmittance TRRi*100%≤30%, where i and j are any two of 1, 2, 3, 4, and 5. In the embodiment, the "transmittance" refers to the percentage of which the light intensity of transmitted light measured after the ambient light penetrates the transparent display device 100 is divided by the light intensity of the measured ambient light that does not penetrate the transparent display device 100. The "light intensity" refers to the spectrum integral value of the light source (e.g., display light or ambient light). In some embodiments, the light source may include visible light (e.g., light with a wavelength ranging from 380 nm to 780 nm) or ultraviolet light (e.g., light with a wavelength less than 365 nm), but the disclosure is not limited thereto. That is, when the light source is visible light, the light intensity is the spectrum integral value with a wavelength ranging from 380 nm to 780 nm. In other embodiments, when two area ranges of the same area are arbitrarily selected from the exposed region 100A of the transparent display device 100, the transmittance of the two area ranges is approximately similar or the same. For example, when selecting an area range of a specific area size in the display area 120A of the exposed region 100A and an area range of the same specific area size in the non-display area 120B of the exposed region 100A, the transmittance of the two areas may be approximately the same or may differ by less than 30%.

Figure 2:
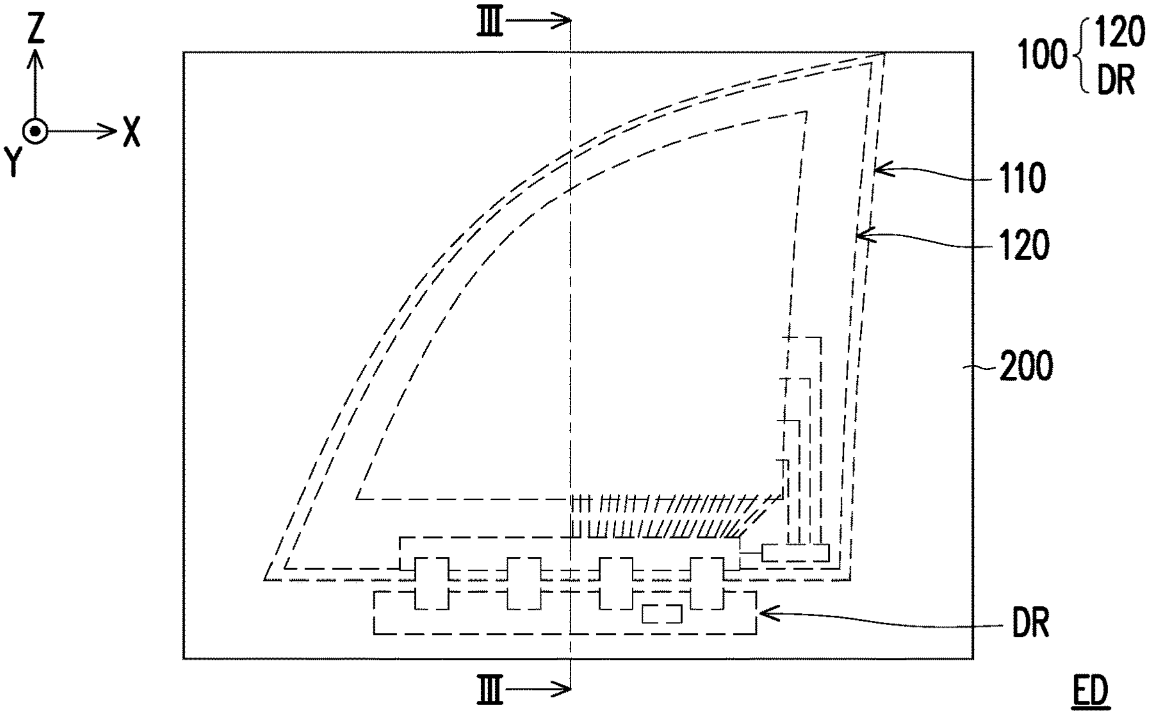
FIG. 2 is a schematic view of a transparent display device in a first state according to an embodiment of the disclosure.
Figure 3:
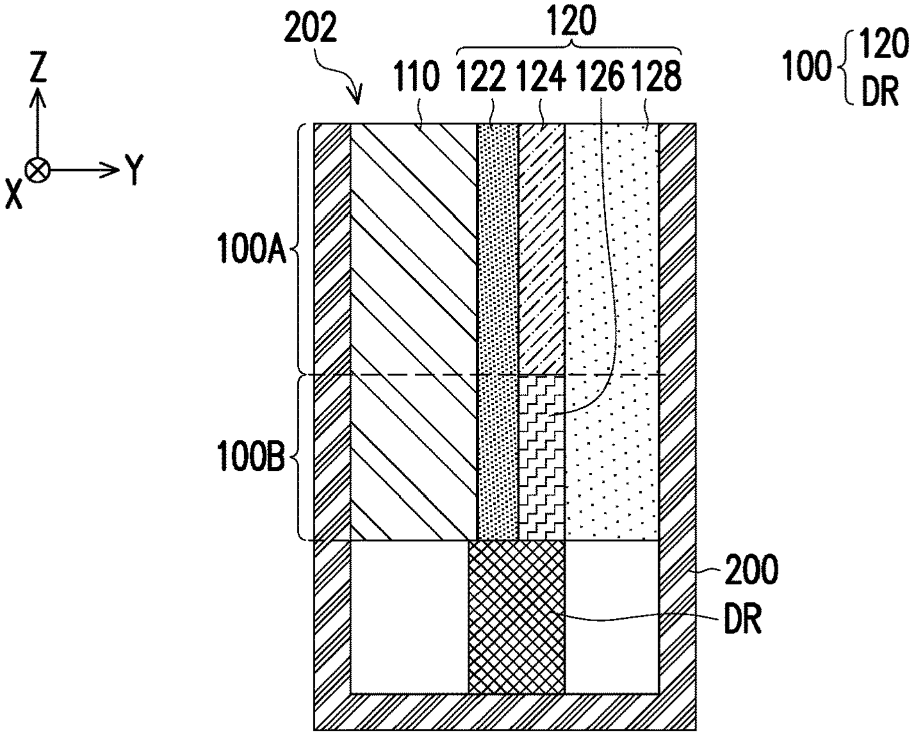
FIG. 3 is a schematic cross-sectional view of the transparent display device of FIG. 2 along the line III-III.

According to some embodiments, with the design in which the transparent display device 100 is disposed on the carrier 110, the transmittance relation of the center point RR1, the edge point RR2, the edge point RR3, the edge point RR4, and the edge point RR5 may also conform to the relation: |(transmittance TRRi−transmittance TRRj)|/transmittance TRRi*100%≤30%, where i and j are any two of 1, 2, 3, 4, and 5. In other words, whether the transparent display device 100 is disposed on the carrier 110 or not, the transmittance corresponding to the center point RR1, the edge point RR2, the edge point RR3, the edge point RR4, and the edge point RR5 are approximately the same; and the effect of uniform transmittance may be achieved. That is, the transmittance of the carrier 110 at each position is approximately the same. FIG. 2 is a schematic view of a transparent display device in a first state according to an embodiment of the disclosure; and FIG. 3 is a schematic cross-sectional view of the transparent display device of FIG. 2 along the line III-III. In FIG. 2, an electronic device ED may include the transparent display device 100, the carrier 110, and a frame 200. The transparent display device 100 may be disposed in the frame 200. In the first state of FIG. 2, the transparent display device 100 may be accommodated in the frame 200. Meanwhile, the transparent display device 100 may be completely hidden by the frame 200. The elements of the transparent display device 100 in FIG. 2 may be the same as or similar to those in FIG. 1, and they are not iterated herein. In FIG. 3, the transparent display device 100 may include the display panel 120 and the driving element DR. The display panel 120 may include a substrate 122, an exposed region element 124, and a non-exposed region element 126. In some embodiments, the exposed region element 124 may include the pixels PX shown in FIG. 1 and related signal lines connected to the pixels PX. In some embodiments, the exposed region element 124 may include a display element, and may also include a touch element, a sensing element, and the like. The non-exposed region element 126 may include the data connection lines SC1 and the scan connection lines SC2 shown in FIG. 1. The driving element DR may include the driving circuit DR1, the driving circuit DR2, the driving carrier board DRB, and the connecting element DRC shown in FIG. 1, the driving circuit DR2 shown in FIG. 1 may also be disposed in the display panel 120 as a part of the exposed region element 124. In addition, the display panel 120 of the transparent display device 100 may further include a protection layer 128 disposed on the substrate 122 and covering the exposed region element 124 and the non-exposed region element 126 to reduce the probability of damage to the exposed region element 124 and the non-exposed region element 126.

The substrate 122 may be a multi-layer substrate including multiple layer structures. In some embodiments, the layer structures of the substrate 122 may include an inflexible substrate, a flexible substrate, an insulating layer, and a conductive layer, or any combination thereof. The substrate 122 may be a rigid substrate, a flexible substrate, or a combination thereof. Moreover, for example, the material of the substrate 122 may include glass, quartz, ceramic, sapphire, plastic, polycarbonate (PC), polyimide (PI), polypropylene (PP), polyethylene terephthalate (PET), other suitable materials, or a combination thereof, but the disclosure is not limited thereto. In some embodiments, at least one of the layer structures of the substrate 122 may have multiple slits or holes, and the slits or holes are disposed in the exposed region 100A of the transparent display device 100. In other embodiments, at least one of the layer structures of the substrate 122 may have slits or holes in the non-exposed region 100B. The disposition of slits or holes in the substrate 122 contributes to improving the flexibility, transparency, and/or stretchability of the substrate 122, so that the display panel 120 may conform to the surface of structures with different curvatures or conform to the surface of different structures in irregular shapes. In some embodiments, the disposition of slits or holes in the substrate 122 may also contribute to improving the transmittance of the display panel 120. In addition, the protection layer 128 may adopt different materials in different regions. For example, the protection layer 128 may include a light-transmitting material in the exposed region 100A and may include an opaque/shielding material in the non-exposed region 100B. For example, the transmittance of the opaque/shielding material is less than that of the light-transmitting material.

According to FIG. 3, the frame 200 may accommodate the transparent display device 100, and the frame 200 has an opening 202. In some embodiments, a driving mechanism (not shown) may be disposed in the frame 200, and the transparent display device 100 may be disposed on the driving mechanism, so that the driving mechanism may push the transparent display device 100 to move in the direction Z, and therefore, the transparent display device 100 may protrude from the opening 202 of the frame 200 to expose the exposed region 100A or the transparent display device 100 is completely hidden in the frame 200. In some embodiments, the design of disposing the transparent display device 100 in the frame 200 may be applied to windows, such as car windows, but the disclosure is not limited thereto. In other embodiments, the design of disposing the transparent display device 100 in the frame 200 may be applied to display windows or similar products.

Figure 4:
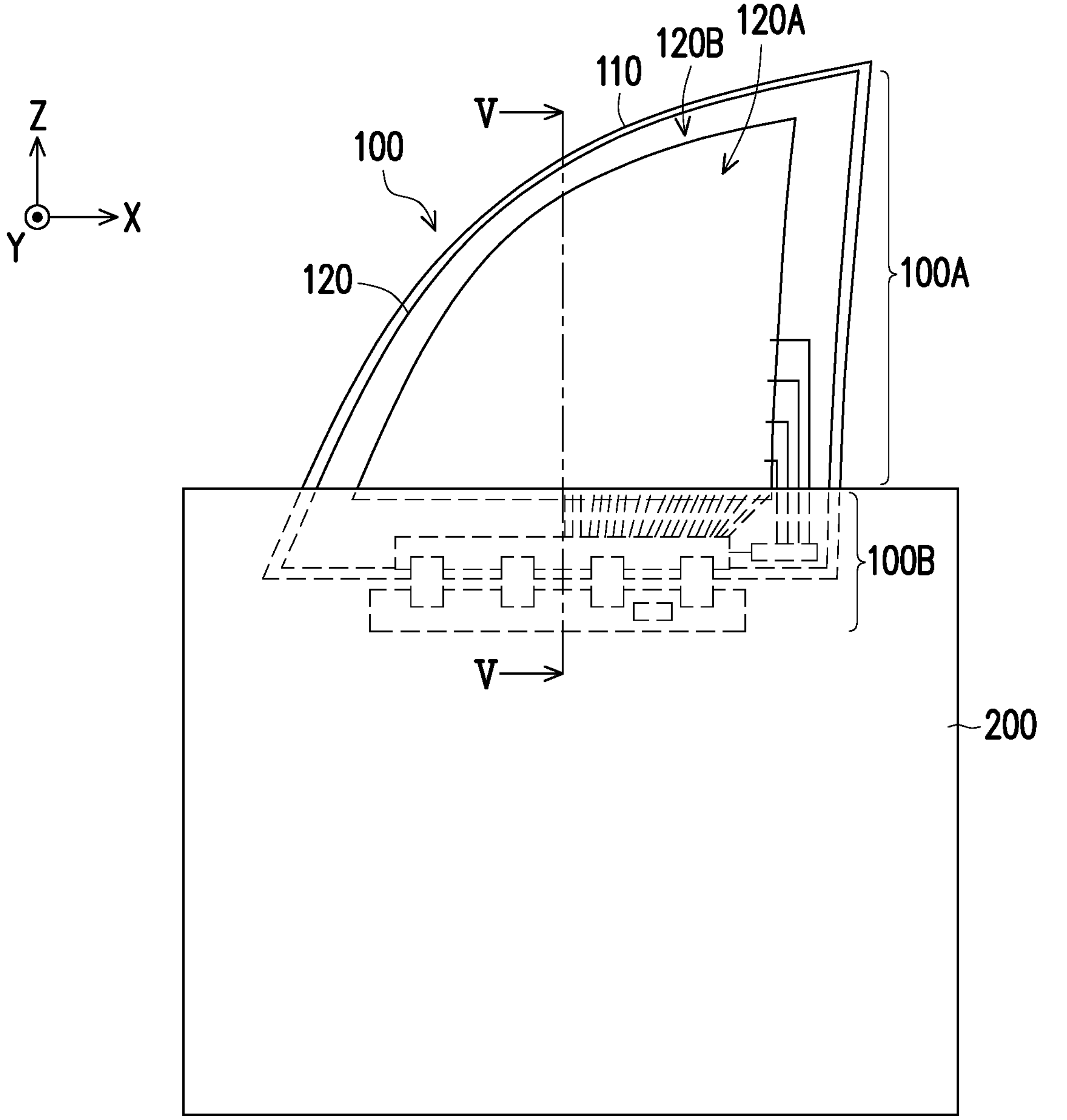
FIG. 4 is a schematic view of a transparent display device in a second state according to an embodiment of the disclosure.
Figure 5:
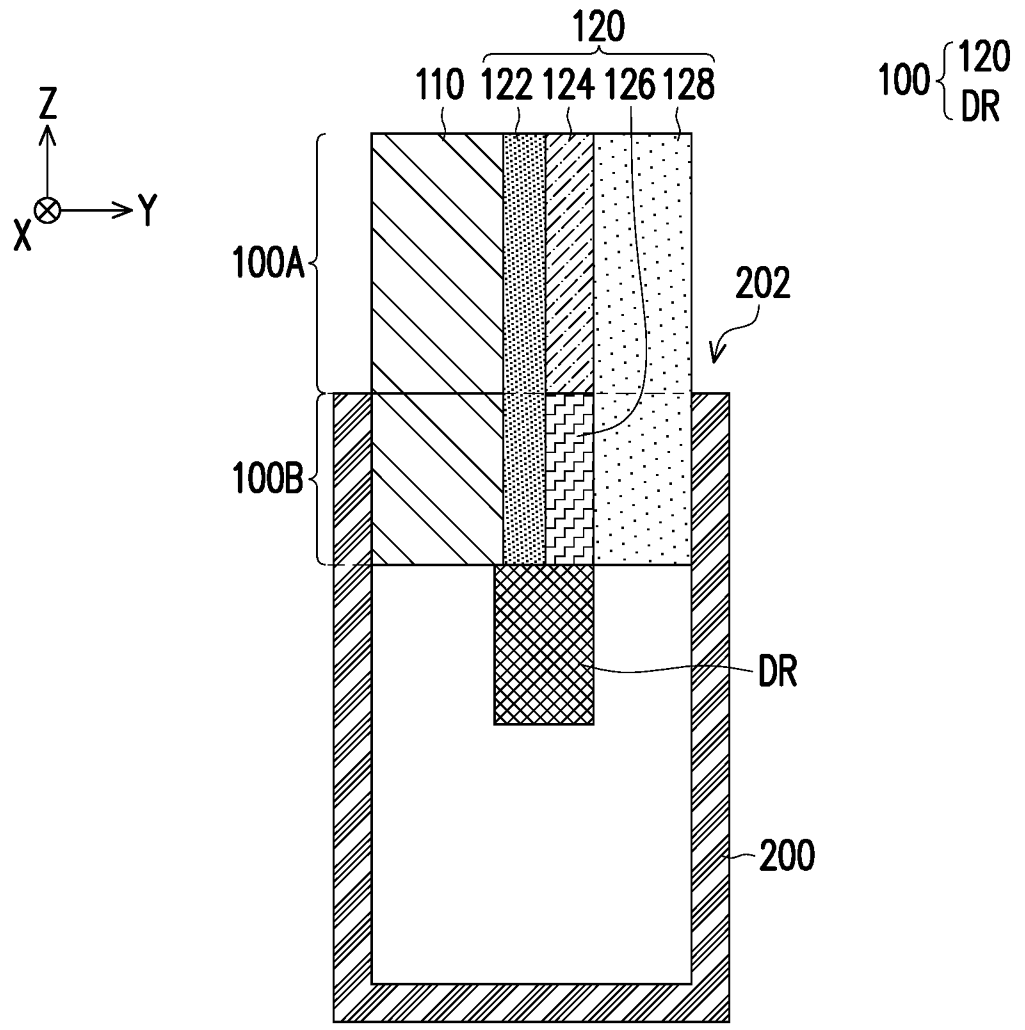
FIG. 5 is a schematic cross-sectional view of the transparent display device of FIG. 4 along the line V-V.

FIG. 4 is a schematic view of a transparent display device in a second state according to an embodiment of the disclosure; and FIG. 5 is a schematic cross-sectional view of the transparent display device of FIG. 4 along the line V-V. The elements shown in FIG. 4 are the same as those in FIG. 2, and the elements shown in FIG. 5 are the same as those in FIG. 3. However, it is illustrated that the transparent display device 100 is in the second state in FIG. 4 and FIG. 5. In the second state, the transparent display device 100 may be moved and then exposed outside the frame 200. In some embodiments, the transparent display device 100 may be moved by the driving mechanism disposed in the frame 200 to be in the state in FIG. 4 and FIG. 5. In the state in FIG. 4 and FIG. 5, the area of the transparent display device 100 not hidden by the frame 200 is the exposed region 100A shown in FIG. 1, and the area of the transparent display device 100 hidden by the frame 200 is the non-exposed region 100B shown in FIG. 1. For example, the state shown in FIG. 4 and FIG. 5 is a state when the driving mechanism is at the limit of movement. That is, the driving mechanism may no longer move the transparent display device 100 further away from the frame 200 in the Z direction from the state of FIG. 4 and FIG. 5. For example, the exposed region 100A is defined in the state of FIG. 4 and FIG. 5, and the boundary of the exposed region 100A may be defined along the boundary of the frame 200 in the state of FIG. 4 and FIG. 5.

In addition, in another state, the relative positions of the transparent display device 100 and the frame 200 may be between those positions shown in FIG. 2 and FIG. 4. Meanwhile, part of the area of the exposed region 100A may be hidden by the frame 200, and the non-exposed region 100B is hidden by the frame 200 in any state. Therefore, when the user is using the device, the non-exposed region 200 may not be seen by the user, and part of the exposed region 100 or the entire exposed region 100 may be seen by the user according to the switch of the operation state. In some embodiments, the transparent display device 100 may be applied to a car window, the first state shown in FIG. 2 and FIG. 3 is a state when the car window is fully opened, and the second state in FIG. 4 and FIG. 5 is a state when the car window is fully closed. According to the description, the exposed region 100A has uniform transmittance, so when the transparent display device 100 is applied to a car window, the car window may have uniform transmittance to display a desired visual effect.

Figure 6:
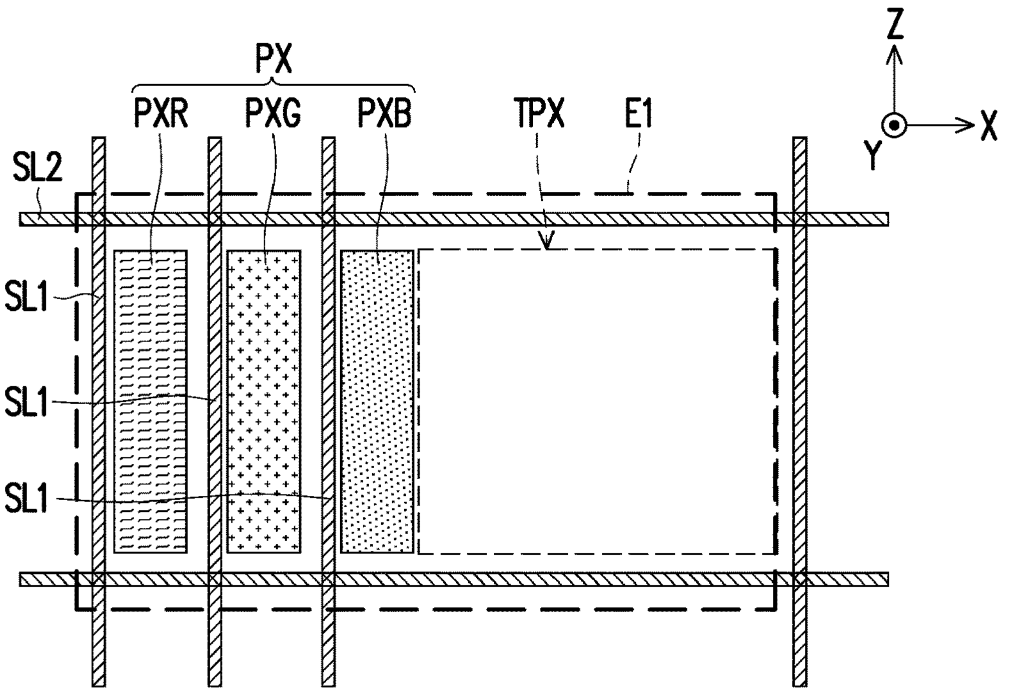
FIG. 6 and FIG. 7 respectively are schematic views of an enlarged area E1 and an enlarged area E2 in FIG. 1 according to some embodiments.
Figure 7:
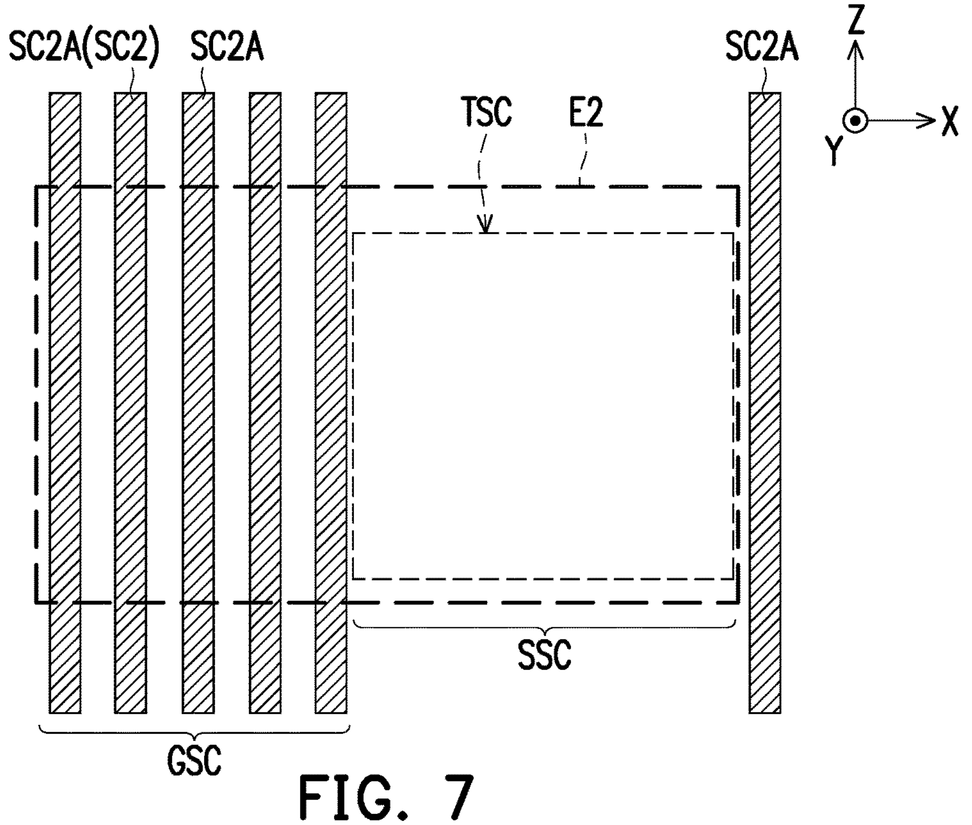

FIG. 6 and FIG. 7 respectively are schematic views of an enlarged area E1 and an enlarged area E2 in FIG. 1 according to some embodiments. In FIG. 6, three pixels PX, including a pixel PXR, a pixel PXG, and a pixel PXB, respectively, may be disposed in the enlarged area E1. In addition, the enlarged area E1 also includes multiple first signal lines SL1 and multiple second signal lines SL2. The pixel PXR, the pixel PXG, and the pixel PXB are each a light-emitting pixel capable of emitting light for displaying images. In some embodiments, the pixel PXR, the pixel PXG, and the pixel PXB may emit light of different colors, such as red light, green light, blue light, etc., but the disclosure is not limited thereto. For example, each of the first signal lines SL1 extends in the Z direction, and each of the second signal lines SL2 extends in the X direction, for example. The pixel PXR, the pixel PXG, and the pixel PXB may share one of the second signal lines SL2, and respectively correspond to different first signal lines SL1. Specifically, FIG. 6 illustrates a layout in which a sequence of the first signal line SL1, the pixel PXR, the first signal line SL1, the pixel PXG, the first signal line SL1, and the pixel PXB in the order is arranged along the X direction, but it is not limited thereto.

In the embodiment, the enlarged area E1 further includes a pixel transparent area TPX. The pixel transparent area TPX refers to an area range without signal lines and pixels PX. That is, the user may see through the transparent display device 100 in the pixel transparent area TPX. In FIG. 6, the pixels PX are disposed in a centralized manner, so the pixel transparent area TPX is disposed on the same side of the pixel PXR, the pixel PXG, and the pixel PXB, but it is not limited thereto. In some embodiments, a transmittance adjustment layer (not shown) may be further disposed in the pixel transparent area TPX or an area corresponding to the pixel transparent area TPX (e.g., an area overlapping the pixel transparent area TPX when viewed along the direction Y). The transmittance adjustment layer may be disposed between the substrate 122 and the carrier 110 in the cross-sectional structure of FIG. 3. The transmittance adjustment layer may control its transmittance through electrical signals. For example, the material of the transmittance adjustment layer may include dichroic dye liquid crystals (DDLCs), polymer dispersed liquid crystals (PDLCs), polymer network liquid crystals (PNLCs), cholesteric liquid crystals (CLCs), electrochromic (EC) materials, suspended particle devices (SPDs), or a combination thereof.

The transmittance adjustment layer may improve the visible contrast of the transparent display device 100. For example, in an environment where the light intensity of the ambient light is high, the transmittance of the transmittance adjustment layer may be reduced, so the ambient light is shielded and it is easier for the image displayed on the transparent display device 100 to be recognized. In addition, in some embodiments, when the transparent display device 100 is applied to products such as car windows or windows and when the light intensity of the ambient light is too high, the transmittance of the transmittance adjustment layer may be reduced to shield the ambient light to improve the visual comfort of passengers. Alternatively, reducing the transmittance of the transmittance adjustment layer contributes to improving the privacy of the passengers, but the disclosure is not limited thereto.

The enlarged area E2 is mainly disposed in the non-display area 120B shown in FIG. 1, multiple scan connection lines SC2 may be disposed in the enlarged area E2, and each of the scan connection lines SC2 may be connected to one of the second signal lines SL2. According to the layout of FIG. 1, each of the scan connection lines SC2 may be adapted to electrically connect one of the second signal lines SL2 to the driving circuit DR2. In addition, each of the scan connection lines SC2 may be divided into an exposed section SC2A of the scan connection line and a hidden section SC2B of the scan connection line. The exposed section SC2A of the scan connection line refers to the section of the scan connection line SC2 disposed in the exposed region 100A, and the hidden section SC2B of the scan connection line refers to the section of the scan connection line SC2 disposed in the non-exposed region 100B. In the enlarged area E2, each exposed section SC2A of the scan connection line of the scan connection line SC2 is illustrated. The layout of the exposed section SC2A of the scan connection line in the enlarged area E2 is being disposed in groups, for example. For example, several exposed sections of the scan connection line SC2A may be disposed in a centralized manner to form a group GSC of scan connection lines, a distance SSC separates adjacent groups GSC of scan connection lines, and there is no connection line in the distance SSC. Therefore, the distance SSC may define a connection line transparent area TSC.

In some embodiments, the enlarged area E1 of FIG. 6 and the enlarged area E2 of FIG. 7 may have the same area, and the pixel transparent area TPX in the enlarged area E1 and the connection line transparent area TSC in the enlarged area E2 may have an approximately same or same area. In this way, the transmittance of the enlarged area E1 and the transmittance of the enlarged area E2 may be approximately the same, so the design of the uniform transmittance of the exposed region 100A (as shown in FIG. 1) may be achieved.

Figure 8:
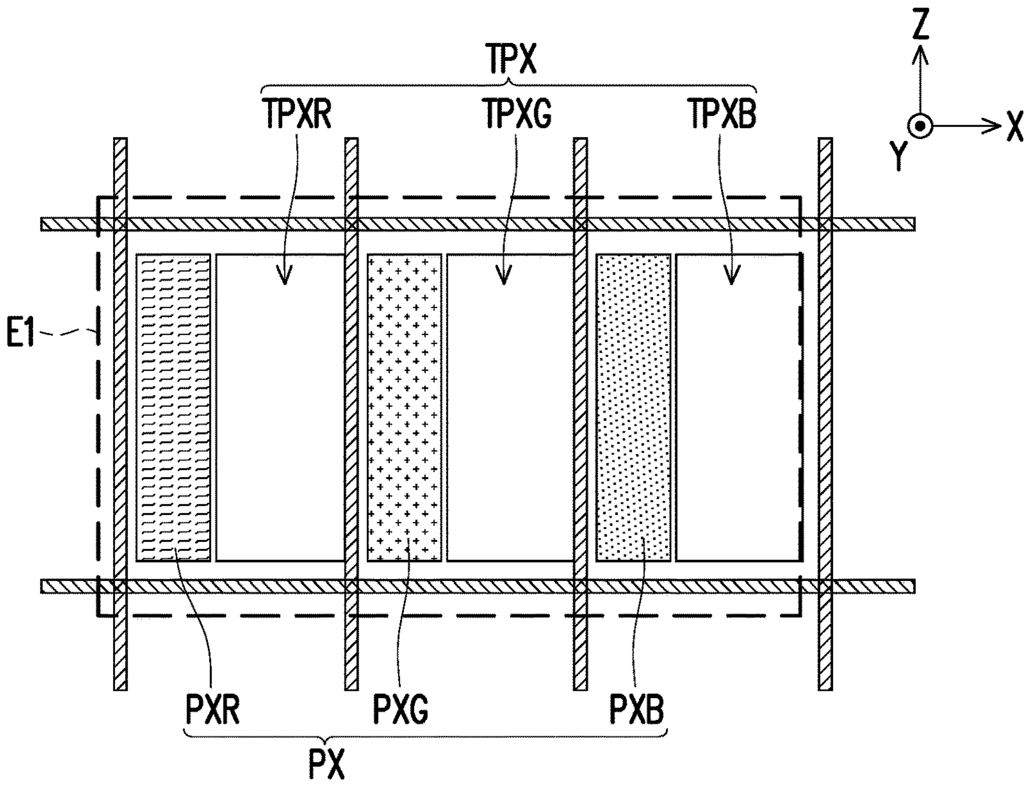
FIG. 8 and FIG. 9 respectively are schematic views of the enlarged area E1 and the enlarged area E2 in FIG. 1 according to other embodiments.
Figure 9:
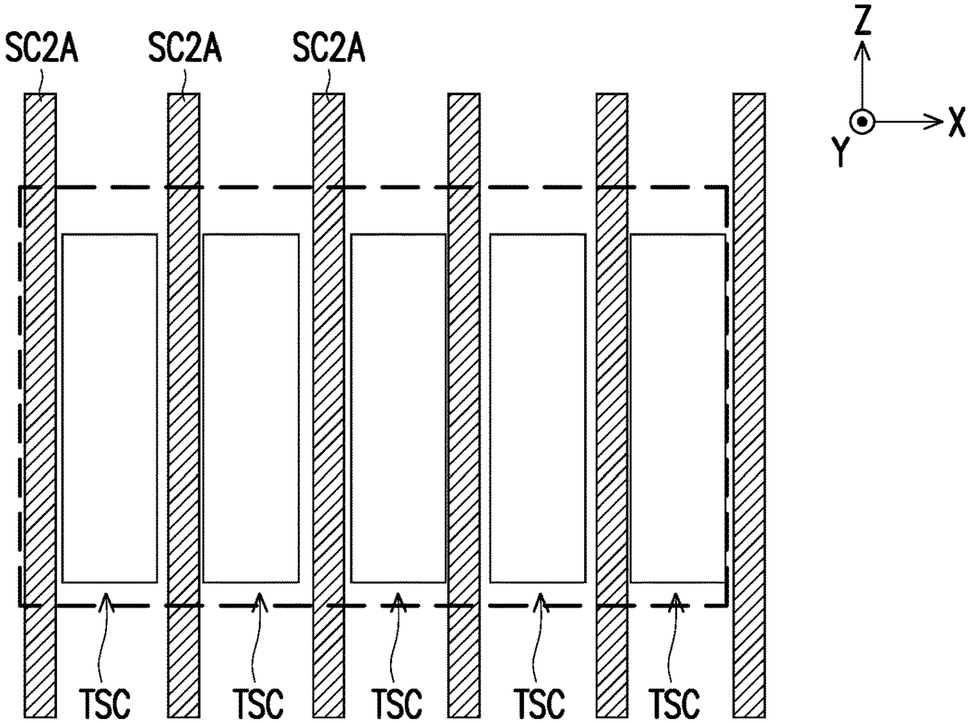

FIG. 8 and FIG. 9 respectively are schematic views of the enlarged area E1 and the enlarged area E2 in FIG. 1 according to other embodiments. The elements shown in FIG. 8 and FIG. 9 are the same as those in FIG. 6 and FIG. 7. However, the layout of the elements in FIG. 8 and FIG. 9 is different from the layout of the elements in FIG. 6 and FIG. 7. In FIG. 8, the pixels PXR, the pixels PXG, and the pixels PXB are disposed in the enlarged area E1 in a substantially equally spaced manner; and the pixel transparent area TPX may be divided into the pixel transparent area TPXR beside the pixels PXR, the pixel transparent area TPXG beside the pixels PXG, and the pixel transparent area TPXB beside the pixels PXB. In FIG. 9, the exposed sections SC2A of the scan connections line are disposed in the enlarged area E2 in a substantially equally spaced manner, and the connection line transparent area TSC is divided into multiple regions by the exposed sections SC2A of the scan connection lines. Overall, when the enlarged area E1 and the enlarged area E2 have similar areas, the overall area of the connection line transparent area TSC may be substantially similar or even equal to the overall area of the pixel transparent area TPX, so the entire exposed region 100A (shown in FIG. 1) has uniform transmittance.

Figure 10:
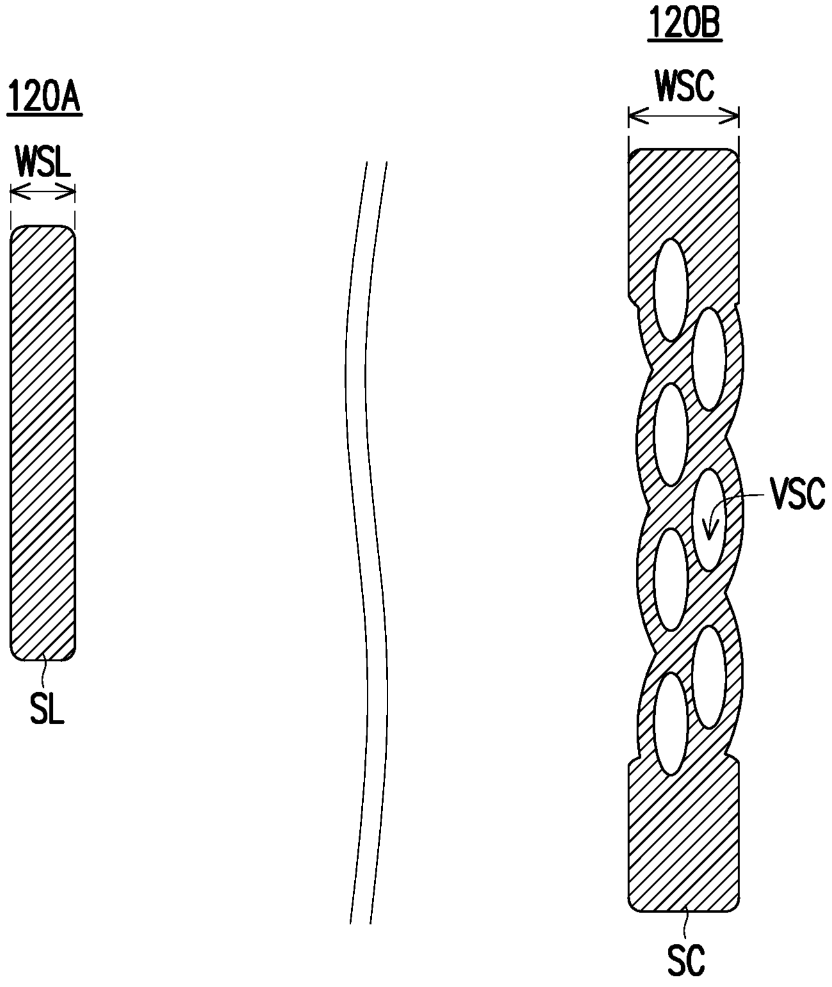
FIG. 10 is a schematic view of part of wires in the transparent display device of FIG. 1.

FIG. 10 is a schematic view of part of wires in the transparent display device of FIG. 1. Specifically, FIG. 10 illustrates a schematic view of a signal line SL disposed in the display area 120A and a signal connection line SC disposed in the non-display area 120B in the transparent display device 100 of FIG. 1. In some embodiments, the signal line SL may be interpreted as an implementation of any first signal line or any second signal line in the enlarged area E1, and the signal connection line SC may be interpreted as an implementation of any scan connection line SC2 in the enlarged area E2, but the disclosure is not limited thereto. In some embodiments, the signal line SL and the signal connection line SC may be different sections of the same conductor line. In FIG. 10, the signal line SL may be a wire with a solid pattern, and the signal connection line SC may be a wire with multiple holes VSC, which accordingly contributes to improving the overall transmittance of the non-display area 120B. In some embodiments, a line width WSC of the signal connection line SC may be greater than a line width WSL of the signal line SL, but the disclosure is not limited thereto. Meanwhile, the measurement of the line width may be interpreted that when a section of the wire extends along an extension direction, the maximum width of the section of the wire in the vertical direction of the extension direction is the line width.

Figure 11:
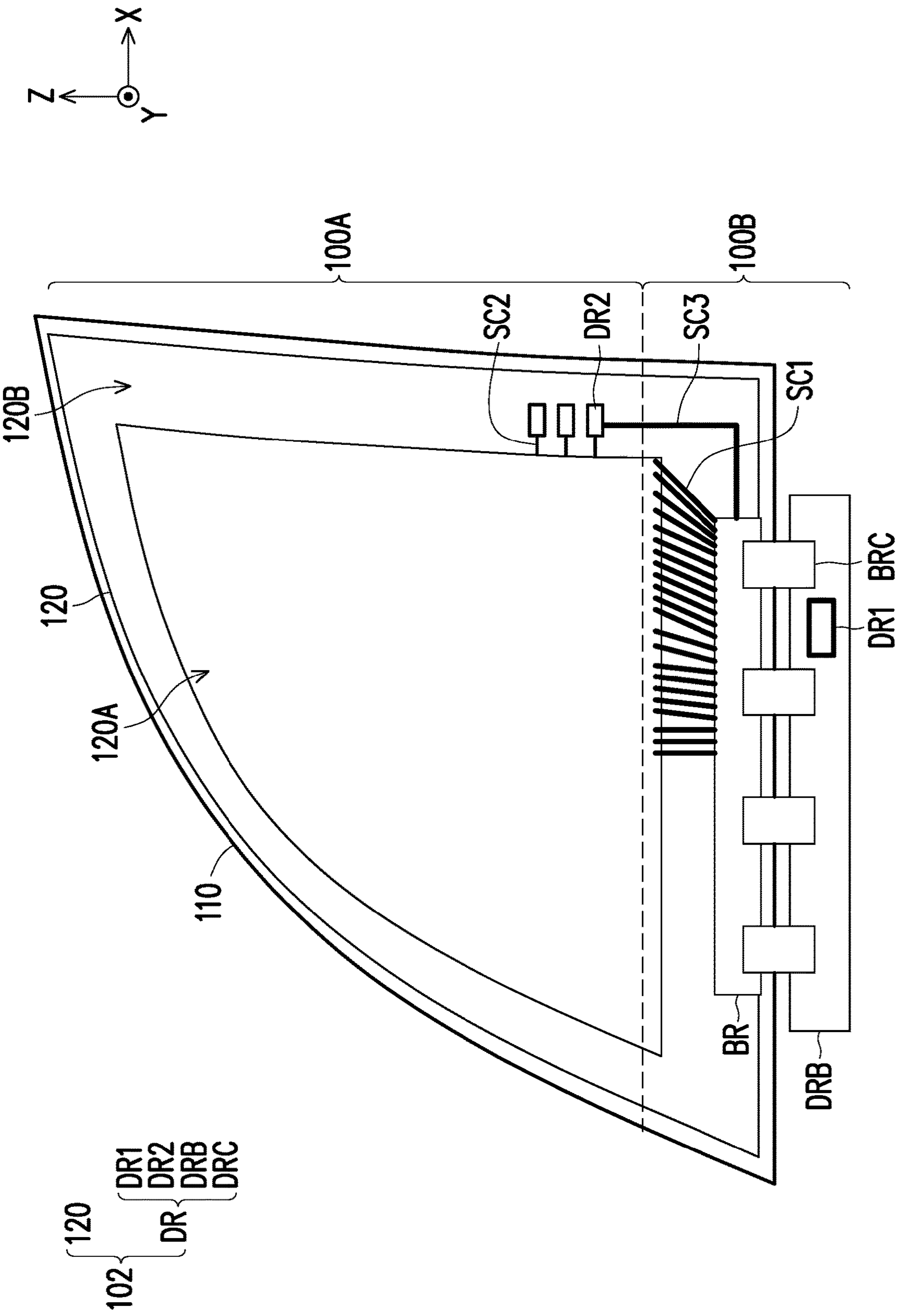
FIG. 11 is a schematic view of a transparent display device according to another embodiment of the disclosure.

FIG. 11 is a schematic view of a transparent display device according to another embodiment of the disclosure. In FIG. 11, the elements of a transparent display device 102 are substantially the same as those of the transparent display device 100, so the same element reference numerals in the two embodiments are interpreted as the same elements. Specifically, the transparent display device 102 includes the display panel 120 and the driving element DR disposed on the carrier 110. The driving element DR may include a data driving element, a gate driving element, a driving carrier board DRB, and a connecting element DRC. The data driving element may include a driving circuit DR1, and the gate driving element may include a driving circuit DR2. The difference between the transparent display device 102 and the transparent display device 100 is where the driving circuit DR2 is disposed. In FIG. 11, the driving circuit DR2 may be disposed in the exposed region 100A, and specifically disposed in the non-display area 120B of the display panel 120. The driving circuit DR2 may be electrically connected to the signal line disposed in the display area 120A of the display panel 120. In some embodiments, the driving circuit DR1 may be connected to the driving circuit DR2 through a corresponding signal connection line SC3.

Figure 12:
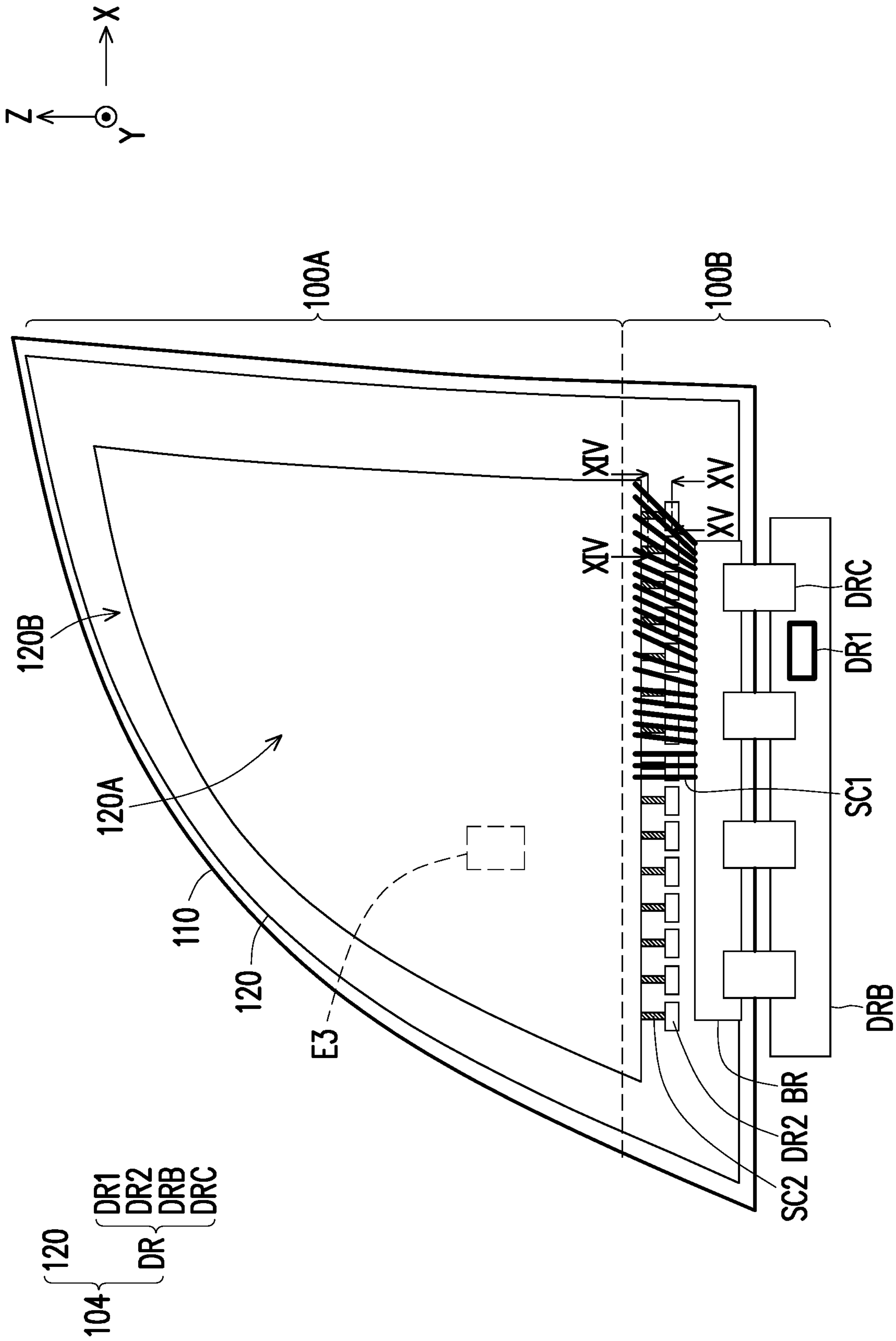
FIG. 12 is a schematic view of a transparent display device according to yet another embodiment of the disclosure.

FIG. 12 is a schematic view of a transparent display device according to yet another embodiment of the disclosure. In FIG. 12, the elements of a transparent display device 104 are substantially the same as those of the transparent display device 100, so the same element reference numerals in the two embodiments are interpreted as the same elements. Specifically, the transparent display device 102 includes the display panel 120 and the driving element DR disposed on the carrier 110. The driving element DR may include a data driving element, a gate driving element, a driving carrier board DRB, and a connecting element DRC. The data driving element may include a driving circuit DR1, and the gate driving element may include a driving circuit DR2. The difference between the transparent display device 104 and the transparent display device 100 is where the driving circuit DR2 and the multiple scan connection lines SC2 are disposed. In FIG. 12, the driving circuit DR2 and the multiple scan connection lines SC2 may be disposed in the non-exposed region 100B, and the driving circuit DR2 is adopted to be electrically connected to the signal line disposed in the display area 120A of the display panel 120.

Figure 13:
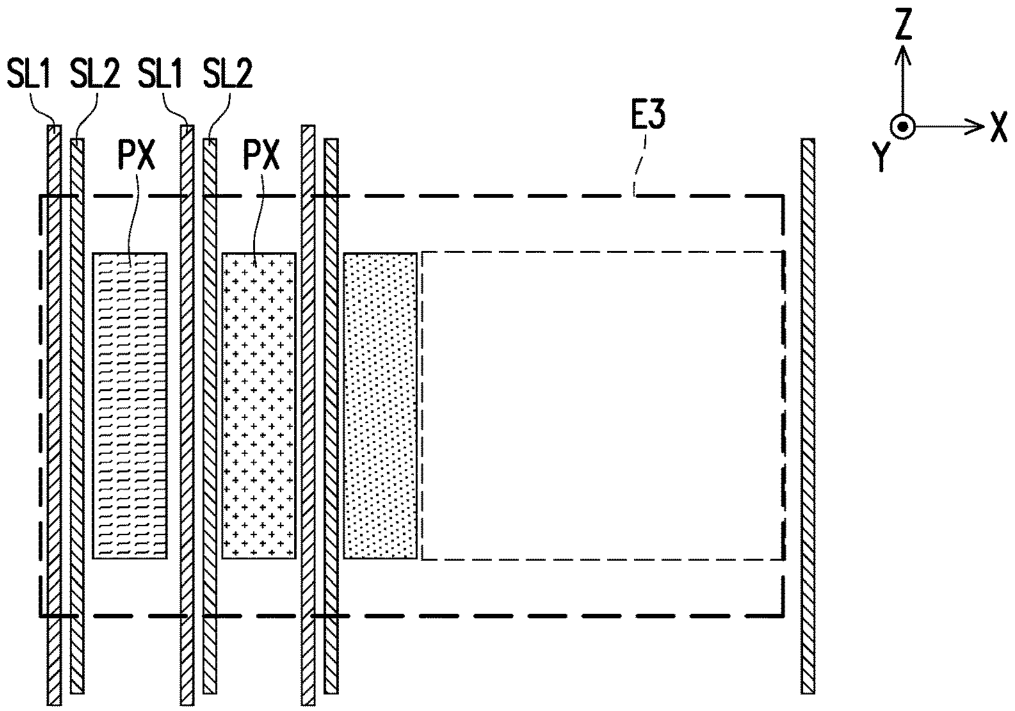
FIG. 13 is a schematic view of an enlarged area E3 of FIG. 12 according to an embodiment.

FIG. 13 is a schematic view of an enlarged area E3 of FIG. 12 according to an embodiment. According to FIG. 12 and FIG. 13, multiple pixels PX, multiple first signal lines SL1, and multiple second signal lines SL2 are disposed in the exposed region 100A in the transparent display device 104. The multiple pixels PX are disposed along the X direction, for example, and a first signal line SL1 and a second signal line SL2 may be disposed between two adjacent pixels PX. The first signal line SL1 and the second signal line SL2 are adopted to transmit different signals, but they generally extend along the Z direction. In some embodiments, the first signal line SL1 may be adopted to transmit data signals, and the second signal line SL2 may be adopted to transmit scan signals. In the embodiment of FIG. 12 and FIG. 13, the first signal line SL1 and the second signal line SL2 both extend in the same direction and extend toward the non-exposed region 100B. The driving circuit DR2 is not disposed in the exposed region 100A, which contributes to improving the uniformity of the transmittance of the exposed region 100A.

According to FIG. 12 and FIG. 13, the data connection line SC1 disposed in the non-exposed region 100B is connected to the first signal line SL1 in the exposed region 100A, for example, and the scan connection line SC2 disposed in the non-exposed region 100B is connected to the second signal line in the exposed region 100A, for example. In addition, the driving circuit DR2 may be disposed in the non-exposed region 100B and between the exposed region 100A and the bonding region BR. The scan connection line SC2 extends between the exposed region 100A and the driving circuit DR2 to connect the second signal line SL2 to the driving circuit DR2. The data connection line SC1 extends between the first signal line SL1 of the exposed region 100A and the bonding region BR. Therefore, the data connection line SC1 and the scan connection line SC2 may partially or completely overlap in the Y direction.

Figure 14:
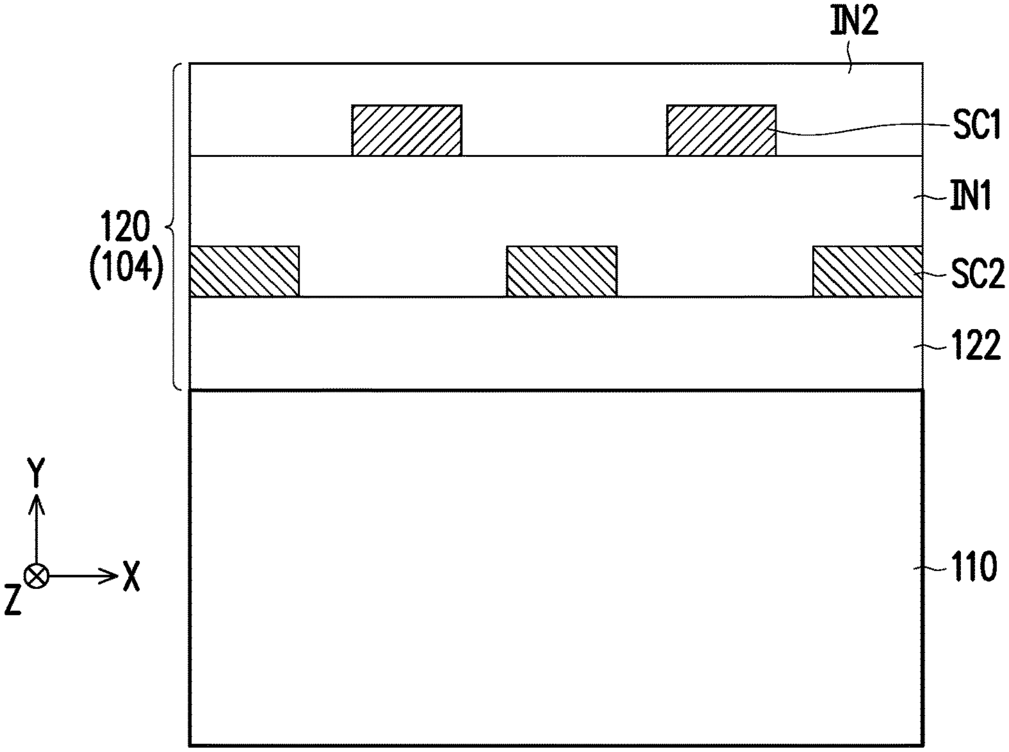
FIG. 14 is a schematic cross-sectional view of the transparent display device of FIG. 12 along the line XIV-XIV according to some embodiments.
Figure 15:
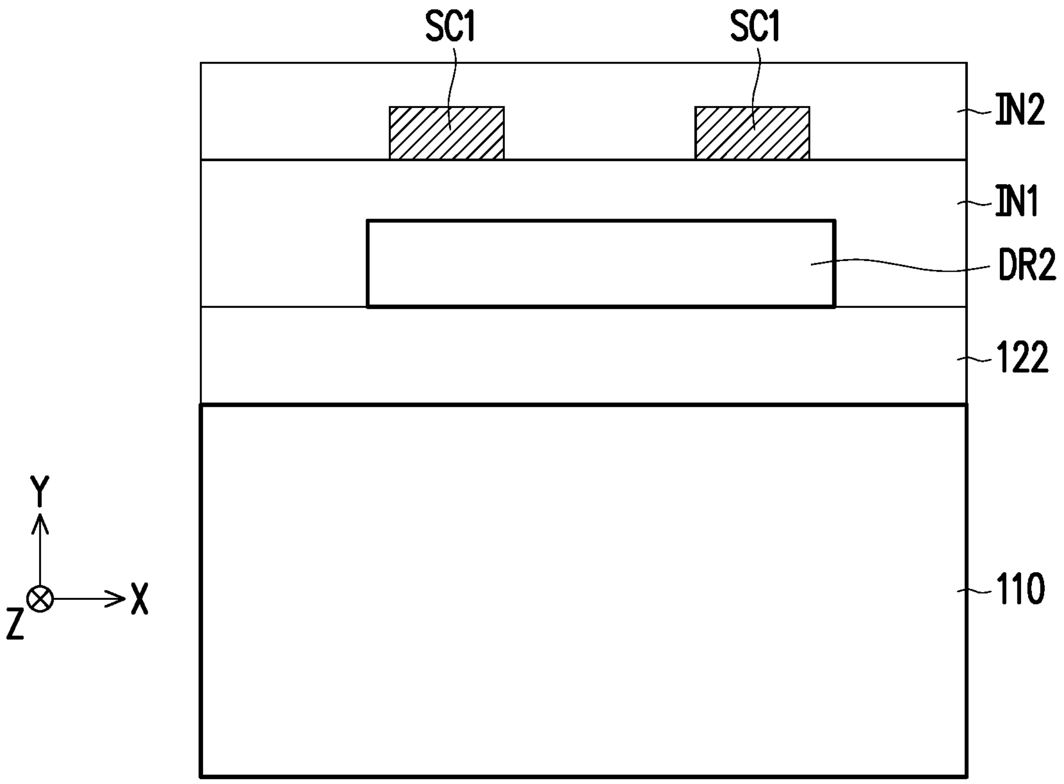
FIG. 15 is a schematic cross-sectional view of the transparent display device of FIG. 12 along the line XV-XV according to some embodiments.

FIG. 14 is a schematic cross-sectional view of the transparent display device of FIG. 12 along the line XIV-XIV according to some embodiments; and FIG. 15 is a schematic cross-sectional view of the transparent display device of FIG. 12 along the line XV-XV according to some embodiments. As shown in FIG. 14 and FIG. 15, the transparent display device 104 may be disposed on the display panel 120 and the driving circuit DR2 on the carrier 110. The display panel 120 includes the substrate 122, the data connection line SC1, the scan connection line SC2, an insulating layer IN1, and an insulating layer IN2. The scan connection line SC2 and the driving circuit DR2 are both disposed on the substrate 122, the insulating layer IN1 covers the scan connection line SC2 and the driving circuit DR2, the data connection line SC1 is disposed on the insulating layer IN1, and the insulating layer IN2 covers the data connection line SC1. In this way, the insulating layer IN1 may separate the scan connection line SC2 from the data connection line SC1, and also separate the driving circuit DR2 from the data connection line SC1. The insulating layer IN1 and the insulating layer IN2 may include a single-layer or multi-layer structure and for example, may include organic materials, inorganic materials, or a combination thereof, but the disclosure is not limited thereto. The organic materials may include polyethylene terephthalate (PET), polyethylene (PE), polyethersulfone (PES), polycarbonate (PC), polymethylmethacrylate (PMMA), polyimide (PI), photo sensitive polyimide (PSPI) or a combination thereof; and the inorganic material may include silicon nitride, silicon oxide, silicon oxynitride, or a combination thereof, but the disclosure is not limited thereto.

Figure 16:
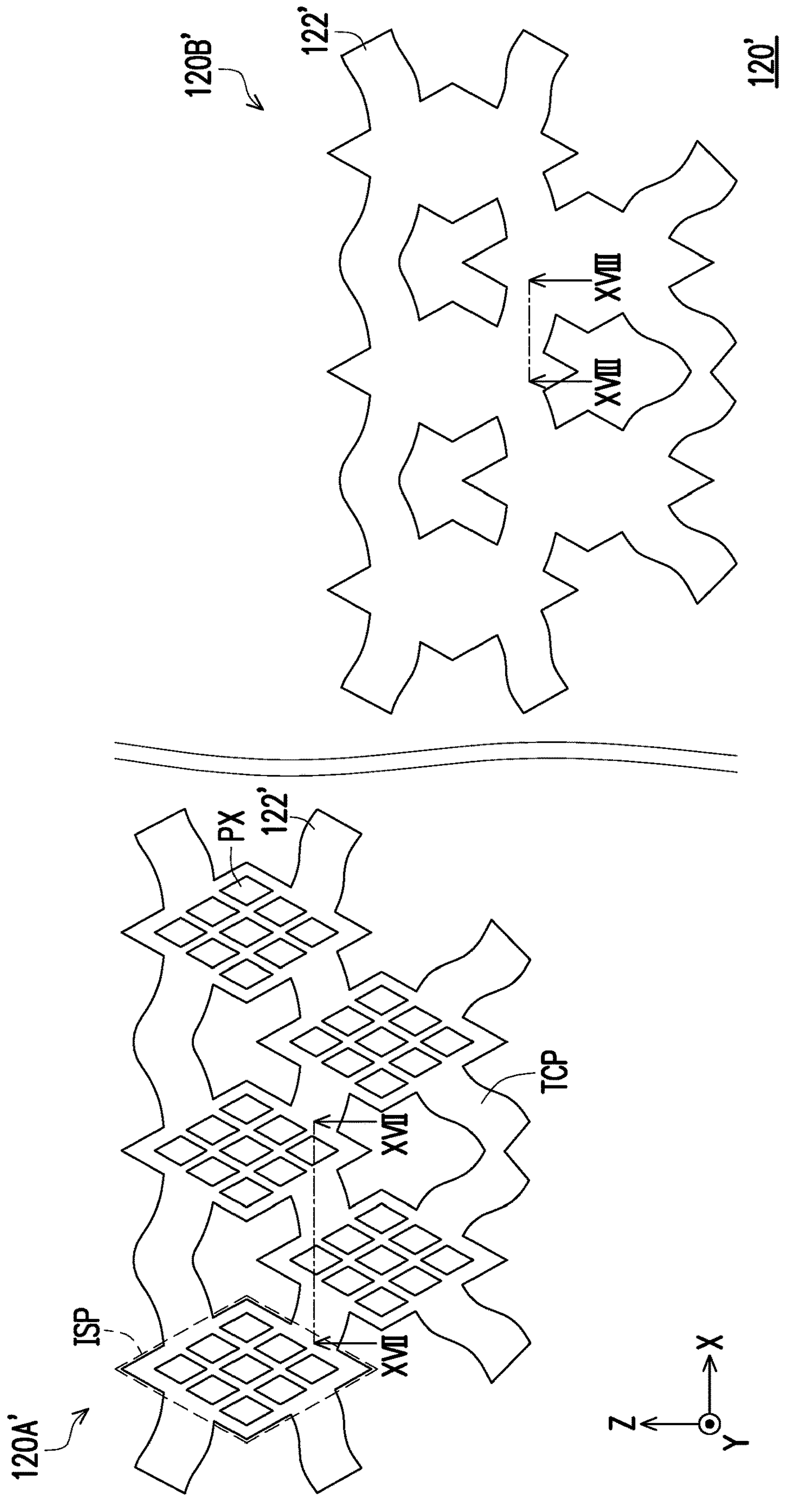
FIG. 16 is a schematic view of a display panel according to some embodiments of the disclosure.

FIG. 16 is a schematic view of a display panel according to some embodiments of the disclosure. A display panel 120' in FIG. 16 is an embodiment of the display panel 120 in FIG. 1, for example, so it may be applied to the transparent display device 100 in FIG. 1. The display panel 120' includes a display area 120A' and a non-display area 120B', the layout of the display area 120A' and the non-display area 120B' is substantially similar to that of the display area 120A and the non-display area 120B of FIG. 1, and the pixels PX are disposed in the display area 120A' of the display panel 120'. The display panel 120' includes a substrate 122', for example, and the substrate 122' is a mesh substrate. In some embodiments, the substrate 122' may be a flexible substrate, but it is limited thereto. When the display panel 120 is applied to the transparent display device 100 of FIG. 1, and the carrier 110 of FIG. 1 is a carrier 110 with a curved surface, the structure and flexibility of the substrate 122' contribute to enabling the display panel 120' to conform to and attach to the surface of the carrier 110 without causing undesired warpage or bending. In some embodiments, the substrate 122' may have stretchable properties.

According to FIG. 16, the substrate 122' of the display panel 120' may include multiple island-shaped portions ISP and a connection portion CTP connected between the island-shaped portions ISP. The pixels PX may be disposed on the island-shaped portions, and multiple pixels PX may be disposed on each of the island-shaped portions ISP. There may be no pixel PX in the connection portion CTP, but the disclosure is not limited thereto. A signal line may be disposed in the connection portion CTP, and the signal line may be adopted to transmit the signal required by the pixel PX. The substrate 122' has a stretchable property, and the island-shaped portions ISP may be rotated in a state when the substrate 122' is stretched. Meanwhile, the connection portion CTP may correspondingly be deformed due to the stretch, but the disclosure is not limited thereto. In some embodiments, the display panel 120' may have a greater thickness at the island-shaped portion ISP where the pixel PX is disposed, and may have a lesser thickness at the connection portion CTP.

Figure 17:
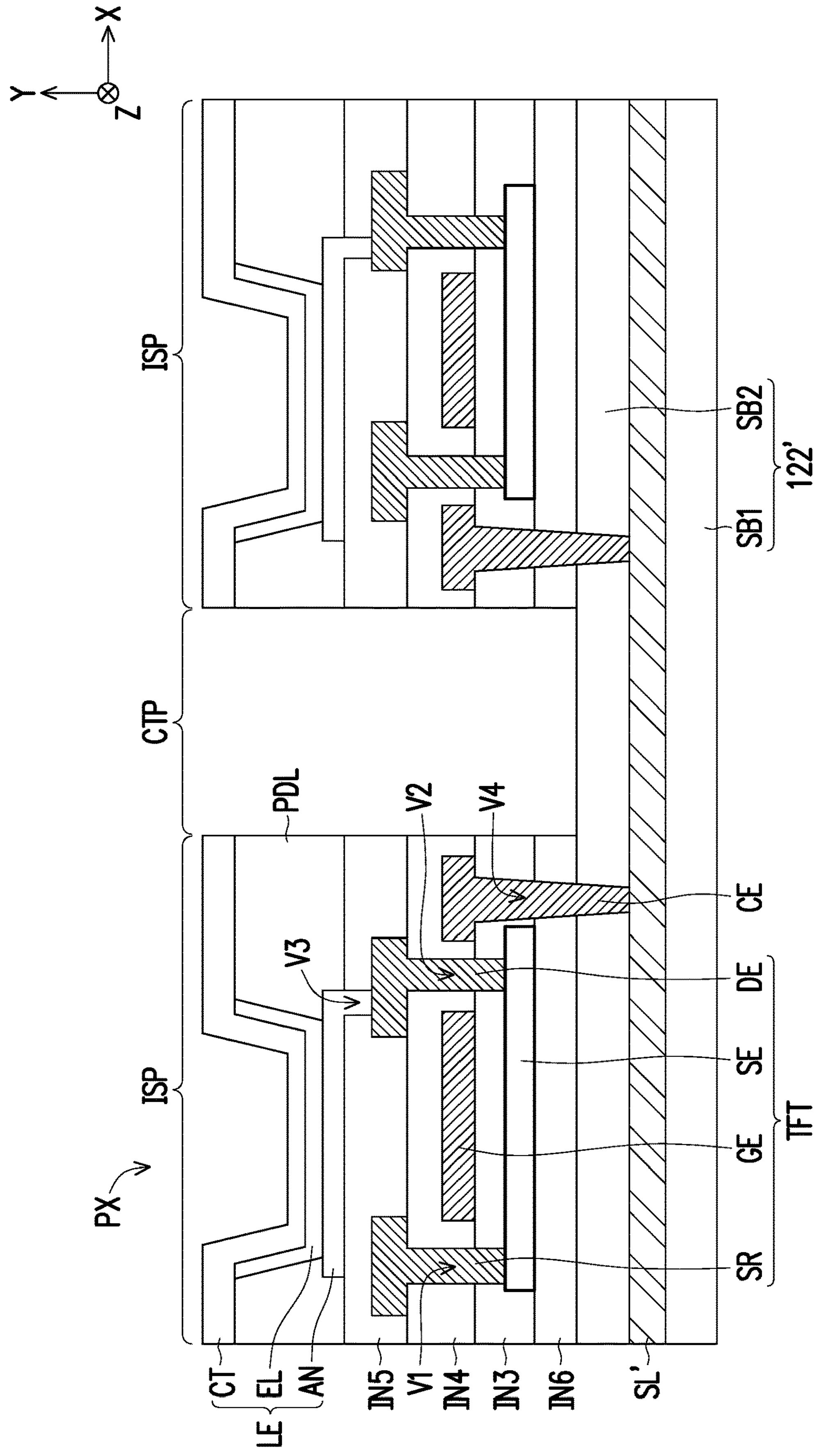
FIG. 17 is a schematic cross-sectional view of the display panel of FIG. 16 along the line XVII-XVII.
Figure 18:
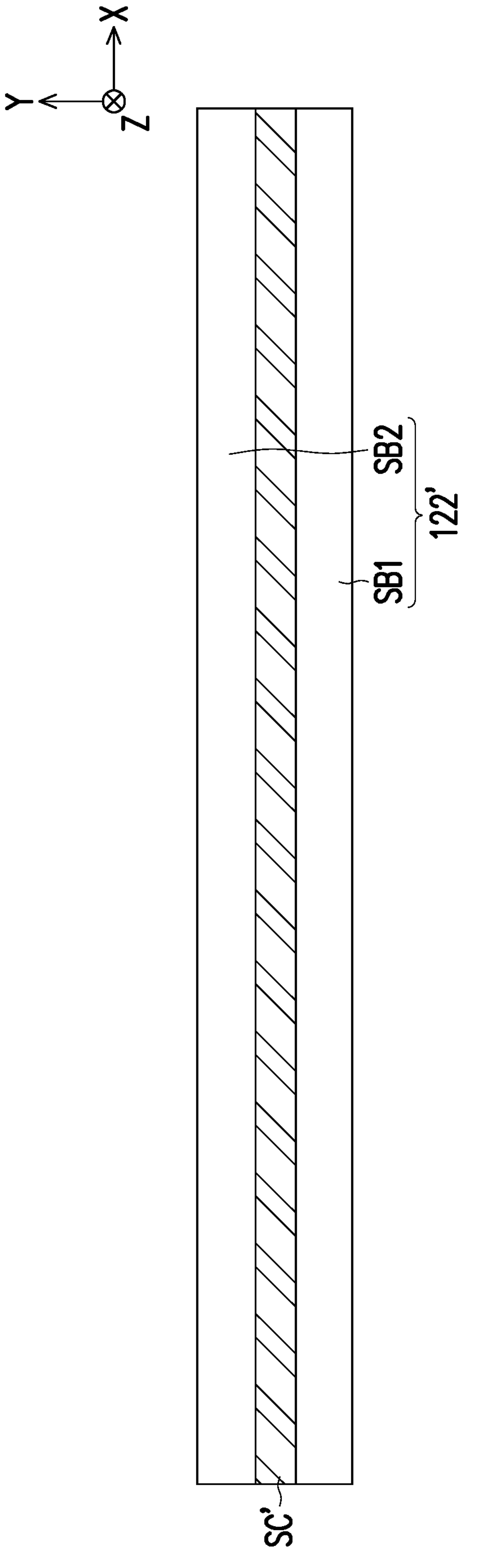
FIG. 18 is a schematic cross-sectional view of the display panel of FIG. 16 along the line XVIII-XVIII.

FIG. 17 is a schematic cross-sectional view of the display panel of FIG. 16 along the line XVII-XVII; and FIG. 18 is a schematic cross-sectional view of the display panel of FIG. 16 along the line XVIII-XVIII. According to FIG. 17 and FIG. 18, the substrate 122' may include a first flexible substrate SB1 and a second flexible substrate SB2. However, in other embodiments, the substrate 122' may include a single-layer flexible substrate. In addition, the pixel PX may include an active element TFT, a light-emitting element LE, and a connection electrode CE disposed on the island-shaped portion ISP of the substrate 122'. The active element TFT includes a semiconductor layer SE, a gate electrode GE, a source electrode SR, and a drain electrode DE; and the light-emitting element LE includes an anode AN, a light-emitting layer EL, and a cathode CT.

The semiconductor layer SE and the gate electrode GE overlap in the Y direction and are separated from each other through an insulating layer IN3. The gate electrode GE is covered by an insulating layer IN4, and the source electrode SR and the drain electrode DE are both disposed on the insulating layer IN4. The insulating layer IN3 and the insulating layer IN4 may be penetrated by vias V1 and V2 so that the source electrode SR and the drain electrode DE contact different parts of the semiconductor layer SE. An insulating layer IN5 covers the source electrode SR and the drain electrode DE.

The anode AN is disposed on the insulating layer IN5, and the insulating layer IN5 may be penetrated by a via V3 so that the anode AN may contact the drain electrode DE. A pixel definition layer PDL is also disposed on the insulating layer IN5, and at least part of the area of the anode AN is not covered by the pixel definition layer PDL. The light-emitting layer EL is disposed on the anode AN and surrounded by the pixel definition layer PDL. The cathode CT covers the light-emitting layer EL and the pixel definition layer PDL.

In addition, a signal line SL' may be disposed between the first flexible substrate SB1 and the second flexible substrate SB2. The signal line SL' may continuously extend between the adjacent island-shaped portions ISP in the display area 120A' and pass through the connection portion CTP. An insulating layer IN6 is further disposed between the second flexible substrate SB2 and the semiconductor layer SE. The insulating layer IN3, the insulating layer IN6, and the second flexible substrate SB2 may be penetrated through a via V4 so that the connection electrode CE contacts the signal line SL'. In some embodiments, the connection electrode CE may be connected to the gate electrode GE, and the signal line SL' is adopted to transmit scan signals. Alternatively, the connection electrode CE may be connected to the source electrode SR, and the signal line SL' is adopted to transmit data signals. In FIG. 18, the signal connection line SC' may be a conductor line disposed in the non-display area 120B' and electrically connected to the signal line SL'. The signal connection line SC' and the signal line SL' may include the same conductor layer.

Figure 19:
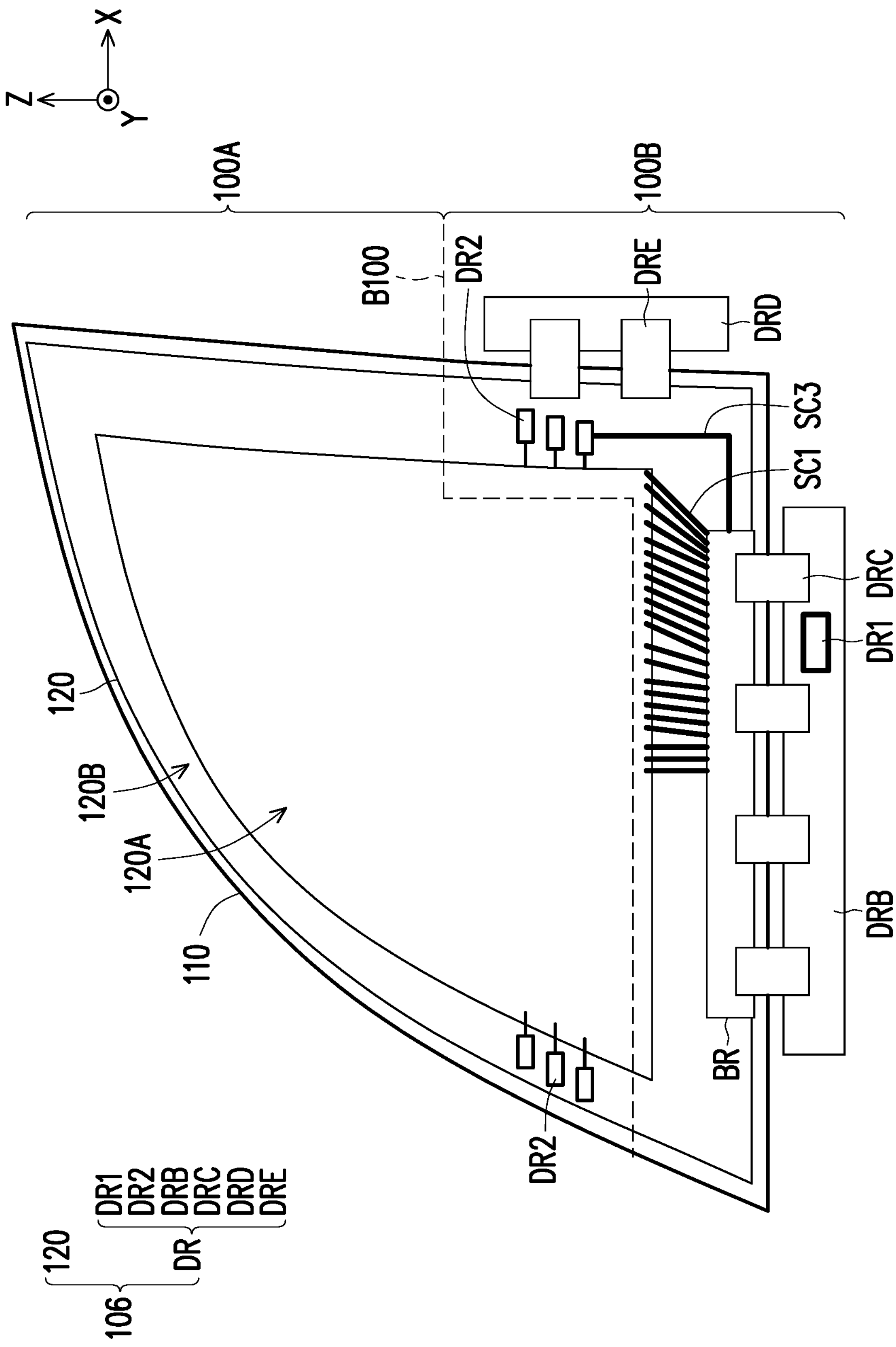
FIG. 19 is a schematic view of a transparent display device according to still another embodiment of the disclosure.

FIG. 19 is a schematic view of a transparent display device according to still another embodiment of the disclosure. In FIG. 19, a transparent display device 106 is substantially the same as the transparent display device in FIG. 11, so the same element reference numerals in the two embodiments are interpreted as the same elements. Specifically, the difference between the transparent display device 106 of FIG. 19 and the transparent display device 102 of FIG. 11 is that a boundary B100 between the exposed region 100A and the non-exposed region 100B of the transparent display device 106 is non-linear. In addition, the driving element DR of the transparent display device 106 may include an additional driving carrier board DRD, which is bonded to the display panel 120 of the transparent display device 106 through a connecting element DRE. Specifically, the driving carrier board DRB and the driving carrier board DRD may be disposed on different sides of the carrier 110. Since the driving carrier board DRB and the driving carrier board DRD are both bonded and disposed in the non-exposed region 100B, the transparent display device 106 may have a relatively uniform transmittance in the exposed region 100A. In some embodiments, the transparent display device 106 may be disposed in the frame (not shown), and the boundary B100 is defined according to the outline of the frame, for example.

Figure 20:
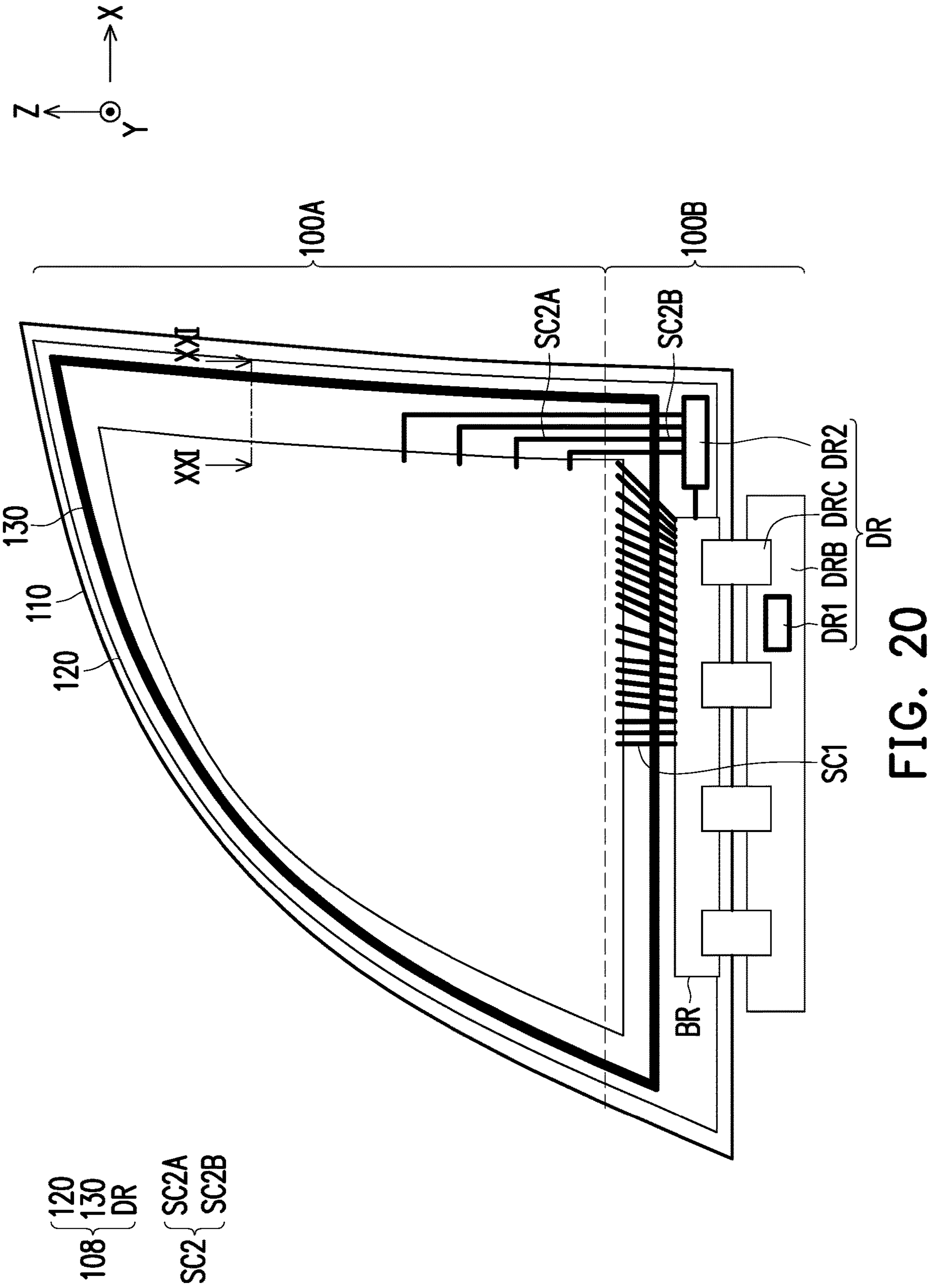
FIG. 20 is a schematic view of a transparent display device according to still yet another embodiment of the disclosure.

FIG. 20 is a schematic view of a transparent display device according to still yet another embodiment of the disclosure. In FIG. 20, a transparent display device 108 is substantially the same as the transparent display device 100 in FIG. 1, so the same element reference numerals in the two embodiments are interpreted as the same elements, and they are not iterated herein. In addition to all the elements of the transparent display device 100 (the display panel 120 and the driving element DR), the transparent display device 108 further includes a slit blocking structure 130, and the slit blocking structure 130 may be disposed along the periphery of the display panel 120.

Figure 21:
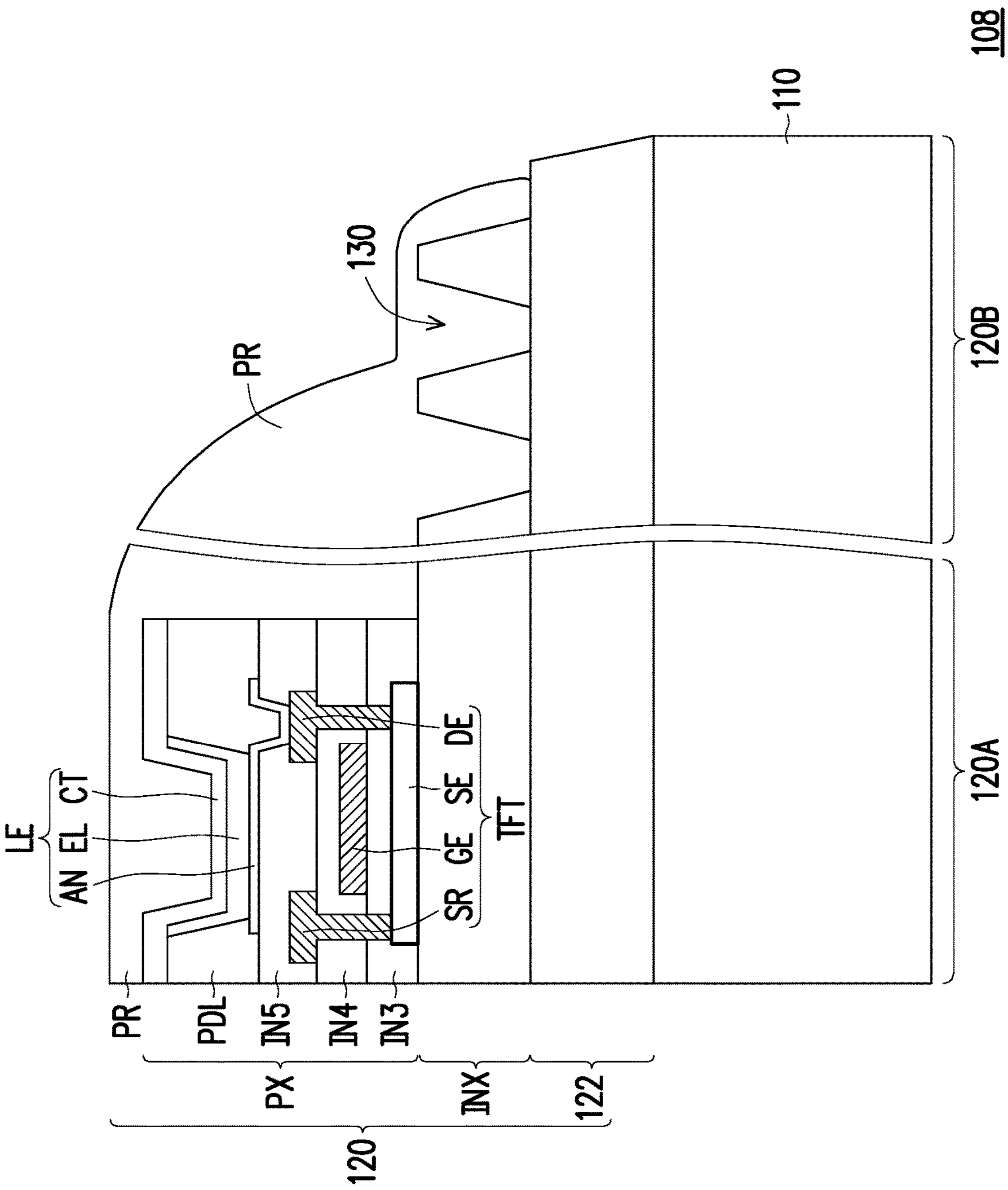
FIG. 21 is a schematic cross-sectional view of the transparent display device of FIG. 20 along the line XXI-XXI according to some embodiments.

FIG. 21 is a schematic cross-sectional view of the transparent display device of FIG. 20 along the line XXI-XXI according to some embodiments. The transparent display device 108 includes the display panel 120. The display panel 120 may be disposed on the carrier 110 and includes the substrate 122, an insulating layer stack INX, the pixel PX, and a protection layer PR. The insulating layer stack INX is disposed on the substrate 122, the pixel PX is disposed on the insulating layer stack INX, and the protection layer PR is disposed on the pixel PX to cover the pixel PX. In the embodiment, the substrate 122 may be a multi-layer substrate including multiple layer structures. In some embodiments, the layer structures of the substrate 122 may include a supporting board, a flexible substrate, an insulating layer, and/or a conductive layer. In some embodiments, at least one of the layer structures of the substrate 122 may have multiple slits or holes, and the slits or holes are disposed in the exposed region 100A of the transparent display device 108. The insulating layer stack INX may include a stack of multiple insulating layers. In some embodiments, at least one insulating layer in the insulating layer stack INX and the insulating layer of the substrate 122 may have the same material. The protection layer PR may adopt different materials in different regions. For example, the protection layer PR may include a light-transmitting material in the exposed region 100A and may include an opaque/shielding material in the non-exposed region 100B. For example, the transmittance of the opaque/shielding material is less than that of the light-transmitting material.

The structure of the pixel PX may refer to the related description of FIG. 17, but the disclosure is not limited thereto. The protection layer PR covers all elements on the substrate 122. Specifically, the pixels PX are disposed in the display area 120A to display images in the display area 120A, and the non-display area 120B may surround the display area 120A. The pixel PX may include the active element TFT and the light-emitting element LE. The active element TFT includes a semiconductor layer SE, a gate electrode GE, a source electrode SR, and a drain electrode DE; and the light-emitting element LE includes an anode AN, a light-emitting layer EL, and a cathode CT.

In addition, the transparent display device 108 further includes the slit blocking structure 130 disposed in the insulating layer stack INX. For example, the slit blocking structure 130 is a groove-shaped structure formed in the insulating layer stack INX. The slit blocking structure 130 may penetrate all or part of the insulating layers of the insulating layer stack INX. The number of the slit blocking structure 130 may be more than one, but may also be one. The protection layer PR may cover the slit blocking structure 130 and the insulating layer stack INX defining the slit blocking structure 130.

Based on the above, the transparent display device of the embodiments in the disclosure includes an exposed region and a non-exposed region. The non-exposed region refers to an area that is hidden by the frame and may not be seen by the user when the device is in operation. In the transparent display device of the embodiments in the disclosure, at least part of the driving elements, such as driving circuits may be disposed in the non-exposed region. In this way, the exposed region of the transparent display device does not include a large-sized shielding element, which contributes to improving the uniformity of the transmittance of the exposed region. In addition, the exposed region of the transparent display device may also provide good light transmittance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transparent display device, comprising:

a display panel comprising a display area, a non-display area adjacent to the display area, and a plurality of pixels disposed in the display area, wherein a difference between a transmittance of the display area and a transmittance of the non-display area is less than 30% of the transmittance of the display area, a frame, wherein the display panel is hidden inside the frame in a first state and is partially exposed outside the frame in a second state; and a driving element electrically connected to the plurality of the pixels, wherein the driving element is hidden inside the frame in both the first state and the second state.

2. The transparent display device according to claim 1, wherein the frame is partially overlapped with the display panel.

3. The transparent display device according to claim 2, wherein the display area is partially overlapped with the frame.

4. The transparent display device according to claim 1, wherein the driving element comprises a data driving element, a gate driving element or a combination thereof.

5. The transparent display device according to claim 4, wherein each of the data driving element and the gate driving element includes a driving circuit.

6. The transparent display device according to claim 1, wherein the driving element comprises a driving carrier board and a connecting element.

7. The transparent display device according to claim 6, wherein the driving carrier board is bonded to the display panel through the connecting element.

8. The transparent display device according to claim 1, wherein the display panel comprises a substrate, a display element and a protection layer.

9. The transparent display device according to claim 8, further comprising a carrier overlapping the display panel.

10. The transparent display device according to claim 8, wherein the display panel further comprises a touch element or a sensing element.

11. The transparent display device according to claim 8, wherein the protection layer covers the plurality of pixels.

12. The transparent display device according to claim 1, wherein the driving element is further electrically connected to a data connection line and a scan connection line, wherein the date connection line and the scan connection line are electrically connected to the driving element and are overlapped with the frame.

13. The transparent display device according to claim 12, wherein the data connection line and the scan connection line are partially overlapped.

14. The transparent display device according to claim 1, further comprising a carrier, wherein an area of the display panel is smaller than or equal to an area of the carrier.

15. The transparent display device according to claim 14, wherein the display panel is disposed on the carrier.

16. The transparent display device according to claim 14, wherein the driving element is disposed on the carrier.

17. The transparent display device according to claim 1, wherein the display area is at least partially exposed outside the frame in the second state.

18. The transparent display device according to claim 1, wherein the non-display area is partially overlapped with the frame.

* * * * *